United States Patent [19]
Shah et al.

[11] Patent Number: 6,141,711
[45] Date of Patent: Oct. 31, 2000

[54] METHOD AND APPARATUS TO ENABLE INSERTION/EJECTION OF A DEVICE IN A COMPUTER SYSTEM WHILE MAINTAINING OPERATION OF THE COMPUTER SYSTEM AND APPLICATION SOFTWARE

[75] Inventors: Pranay D. Shah, Fremont; Kenneth C. Ma, Cupertino; Jeffrey A. Hawkey, Morgan Hill, all of Calif.; Kenneth J. Kotlowski, Easley, S.C.

[73] Assignee: National Semiconductor Corporation, Santa Clara, Calif.

[21] Appl. No.: 08/769,998

[22] Filed: Dec. 19, 1996

[51] Int. Cl.⁷ .................................................. G06F 13/00
[52] U.S. Cl. ...................... 710/103; 710/101; 710/128; 710/129; 713/601
[58] Field of Search .................... 395/281–283, 395/287–288, 306–309, 556, 560, 878, 880, 881

[56] References Cited

U.S. PATENT DOCUMENTS

| | | | |
|---|---|---|---|
| 4,835,737 | 5/1989 | Herrig et al. | 710/129 |
| 5,265,238 | 11/1993 | Canova et al. | 395/500 |
| 5,310,998 | 5/1994 | Okuno | 395/282 |
| 5,323,291 | 6/1994 | Boyle et al. | 361/683 |
| 5,377,357 | 12/1994 | Nishigaki et al. | 395/800 |
| 5,386,567 | 1/1995 | Lien et al. | 395/282 |
| 5,396,602 | 3/1995 | Amini et al. | 395/325 |
| 5,430,847 | 7/1995 | Bradley et al. | 395/325 |
| 5,454,081 | 9/1995 | Thome | 395/281 |
| 5,463,742 | 10/1995 | Kobayashi | 395/281 |
| 5,522,089 | 5/1996 | Kikinis et al. | 395/893 |
| 5,526,493 | 6/1996 | Shu | 395/281 |
| 5,560,022 | 9/1996 | Dunstan et al. | 395/750 |
| 5,564,024 | 10/1996 | Pemberton | 395/283 |
| 5,598,539 | 1/1997 | Gephardt et al. | 395/281 |
| 5,664,118 | 9/1997 | Nishigaki et al. | 395/283 |
| 5,680,540 | 10/1997 | Pearce | 395/182.22 |
| 5,694,600 | 12/1997 | Khenson et al. | 395/652 |
| 5,761,460 | 6/1998 | Santos et al. | 395/309 |

FOREIGN PATENT DOCUMENTS

| | | |
|---|---|---|
| 0 241 905 | 10/1987 | European Pat. Off. . |
| 0 373 773 | 6/1990 | European Pat. Off. . |

OTHER PUBLICATIONS

IBM Technical Disclosure Bulletin; Sensing the Presence of an Expansion Module; vol. 37, No. 10; Oct. 1994.
Pico Power Technology Inc., "Docking/Undocking Interface for Vesuvius Platform," Rev 1.0, Apr. 7, 1995.

*Primary Examiner*—Ayaz R. Sheikh
*Assistant Examiner*—Raymond N Phan
*Attorney, Agent, or Firm*—Limbach & Limbach LLP

[57] ABSTRACT

A secondary bus controller allows for hot insertion and ejection of devices from the secondary bus without ceasing operations or halting software in the host computer. When a device is to be inserted a signal is sent to the secondary bus controller. The secondary bus controller suspends operation of the secondary bus, placing devices on the secondary bus in stasis. An interrupt handler reconfigures the system for the newly inserted card once it has been inserted. Attempts to access devices on the secondary bus during the insertion process may be met with a retry signal until insertion is complete. The ejection process follows similar steps, isolating and suspending operations on the secondary bus and triggering an interrupt routine in the host processor to reconfigure the system. The host processor and primary busses, along with the secondary bus controller remain active throughout the insertion or ejection processes. Thus, applications running on the host computer need not be terminated during insertion or ejection. The present invention has particular application to network server computer systems.

18 Claims, 13 Drawing Sheets

METHOD AND APPARATUS TO ENABLE INSERTION/EJECTION OF A DEVICE IN A COMPUTER SYSTEM WHILE MAINTAINING OPERATION OF THE COMPUTER SYSTEM AND APPLICATION SOFTWARE

CROSS-REFERENCE TO RELATED APPLICATIONS

The subject matter of the present application is related to that in co-pending application Ser. No. 08/464,145, filed Jun. 5, 1995, entitled "Method and Apparatus to Enable Docking/Undocking of a Powered-on Bus to a Docking Station", incorporated herein by reference.

FIELD OF THE INVENTION

The present invention relates generally to an apparatus and method for controlling insertion and removal of a device from an operating computer system. More specifically, the present invention relates to a method and apparatus for allowing insertion and removal of a device card or the like to or from a computer system such a network server, without interrupting operation of the computer system, operating software, or network.

BACKGROUND OF THE INVENTION

Computer networks may be used in many applications to provide a means for sharing data, programs, and the like among a number of computers. Many computer networks use what is known as client/server system in which a network server provides a number of centralized hardware/software resources for a number of client computers in the network.

One disadvantage of client/server systems, is that if the server is shut down for any length of time, the operation of the network and the various client computers may be disrupted. Such disruptions defeat one of the fundamental advantages of the personal computer (PC), namely, the stand-alone operability of the PC.

Network servers may be shut down periodically for a number of reasons. For example, it may be necessary to install software upgrades or to reset stuck applications or the like. In addition, it may be necessary to shut down a server computer to install hardware upgrades or to replace defective hardware components. In addition, a server may be shut down in order to swap hardware or to install accessory hardware devices. For example, it may be desirable to attach a data storage device (e.g., portable hard drive, CD-ROM, or the like) to a server to allow client computers to access data stored on that data storage device.

Thus, it may be desirable to provide a method and apparatus whereby hardware devices may be attached or removed (i.e., inserted or ejected) from a server computer. In the prior art, techniques have been tried to allow for insertion and removal of attachments in fully initialized computer systems. One such system is disclosed, for example, in Lien et al., U.S. Pat. No. 5,386,567, issued Jan. 31, 1995 and incorporated herein by reference.

Lien utilizes pins of varying lengths on his adapter device such that when the adapter is inserted into the fully initialized computer, longer pins are used to signal the host computer that an adapter is being inserted and to supply power to the adapter prior to transmitting signals to and from the adapter.

Lien discloses using a mechanically actuated lock mechanism for his adapter which locks the adapter into the host computer until a request is made by a user to release the adapter. Moreover, the longer pins of Lien are used to allow the power supply to stabilize and settle before transmitting signals to and from the device (Col. 5, lines 10–16). A stored ID code is then transmitted to the host computer to determine if the adapter is compatible with hot insertion and attribute information read out if hot insertion is acceptable (Col. 5, lines 17–24).

The system of Lien et al. does not appear to be readily adaptable to a network environment where a plurality of client applications may be running during insertion and/or removal of a device. In a network environment, it may be necessary to maintain operation of client software during insertion and/or removal of a hardware device from the system. Moreover, such operability may also be desirable in stand-alone or client computers as well.

Some prior art systems achieve hot insertion or ejection by storing the status of a system (shadowing contents of registers and the like) into memory and suspending operations of the primary host processor. The primary host processor then may be loaded with new software to handle the hot insertion or ejection processes. Once insertion or ejection is complete, the stored contents of system registers may be restored and processing resumed.

For a stand-alone or client PC, such a system may be acceptable, as the primary user of such a PC may not be using the PC during insertion or removal. However, it may not be acceptable for a server computer in a client/server system (or a PC in a peer-to-peer LAN) to be shut down even momentarily for device insertion or ejection. If a server computer is shut down even momentarily, numerous client computers in the network may be disrupted.

SUMMARY OF THE INVENTION

The present invention provides a method and apparatus to allow insertion/ejection of a device into a fully operational computer system and provide automatic reconfiguration of the computer system upon insertion or ejection. A secondary bus is provided for removable devices. Upon card insertion, the insertion event is detected by an insertion detection mechanism or from a signal initiated by a user. The secondary bus is isolated and put under a static state by a secondary bus controller to prevent electrical damage to devices on the secondary bus and to prevent spurious signals on the secondary bus from being recorded by other devices.

The computer system is notified of the insertion event by an interrupt driven by the secondary bus controller. Once the device is inserted, the secondary bus is restarted by the secondary bus controller. The computer system is reconfigured and the newly inserted card may be locked to prevent spurious ejection. During the insertion process the computer system, other than the secondary bus, is kept running and software applications are also kept running.

The card ejection event may be initiated by a user. The secondary bus controller notifies the computer system of the ejection event and identifies the requesting card by an interrupt. The computer system closes application resources for the card requesting ejection and notifies the ejection bus controller of the completion of resource closing. The secondary bus is isolated and put under a static state by the secondary bus controller to protect devices on the secondary bus from electrical damage and prevent devices on the secondary bus from recording spurious signals which may lead to system misbehavior.

The card requesting ejection is then unlocked and the user is notified to eject the card. The computer system is notified of ejection completion by an interrupt driven by the secondary bus controller. The secondary bus is then restarted by the secondary bus controller and the computer system reconfigured.

DETAILED DESCRIPTION OF THE INVENTION

Figure 1:
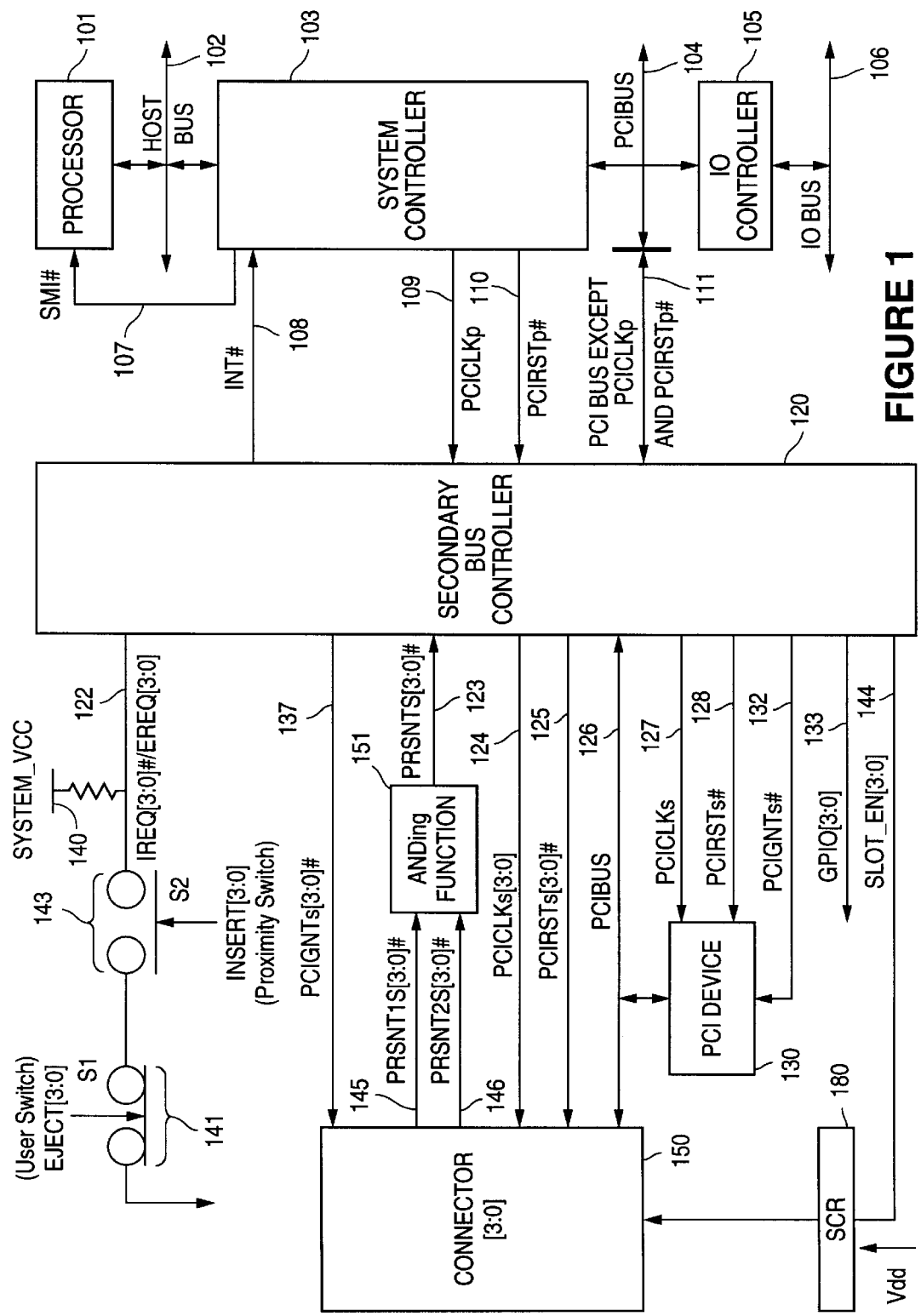
FIG. 1 is a block diagram illustrating the preferred embodiment of the apparatus of the present invention.

FIG. 1 is a block diagram illustrating the preferred embodiment of the present invention as installed in a host computer system. In FIG. 1, processor 101 may comprise a host processor of a computer system (e.g., network server computer) and may comprise any one of a number of known processor types (e.g., Intel 80x86, Motorola 68xx, Cyrix x86, AMD x86, MIPS, Alpha, or the like).

It should be noted that one goal of the present invention is to provide a technique for hot insertion/removal of a device which is independent of processor type. In the preferred embodiment of the present invention, the apparatus and method of the present invention may be utilized in a Windows NT or Windows 9x operating system environment.

Processor 101 may be coupled to other devices through host bus 102 which may comprise any one of a number of known host busses (e.g., Pentium™ bus, Pentium Pro™ bus, or the like). Moreover processor 101 may comprise one or all of a number of processors in a multi-processor system. System controller 103 may be one of those devices coupled to processor 101 through host bus 102. System controller 103 may comprise one or more semiconductor circuits comprising a portion of a chip set for a computer system. System controller 103 may control input and output to processor 101 and interface processor 101 to additional busses.

Primary PCI bus 104 may be interfaced to processor 101 through system controller 103. Primary PCI bus 104 may interface any one of a number of devices through system controller 103, such as I/O controller 105 which may in turn drive I/O bus 106. Although primary PCI bus 104 is illustrated here as a PCI (Peripheral Component Interface) bus, other bus types may be utilized without departing from the spirit and scope of the present invention. The PCI bus is used in the preferred embodiment of the present invention as it is a widely used industry standard and a number of devices are available which support the PCI bus protocol.

Secondary bus controller 120 may reside as a device on primary PCI bus 104 interfaced through a portion of primary PCI bus 104 illustrated in FIG. 1 with reference numeral 111. Primary PCI bus portion 111 contains data, address, and control lines of PCI bus 10. Primary PCI bus clock PCI-CLKp on line 109 and primary PCI bus reset signal PCIR-STp# on line 110 may be routed directly to system controller 103, as illustrated in FIG. 1. Note that the # in reset signal PCIRSTp# indicates an active low signal, as is known in the art.

Secondary bus controller 120 may comprise a PCI expansion bus controller modified as described herein. A plurality of secondary bus controller(s) 120 may be provided to allow expansion for a number of devices. In the preferred embodiment, each of secondary bus controller 120 may provide an interface for up to five PCI devices (e.g., four removable devices and one fixed device). Additional secondary bus controllers 120 may be added by interfacing such controllers directly to system controller 103 in the manner illustrated in FIG. 1 or by chaining such secondary bus controller(s) 120 in series.

Secondary bus controller 120 may provide its own secondary PCI bus 126 which may in turn interface a number of PCI devices to processor 101. In a typical PCI bus environment, ten devices may be supported within a single bus. A further number of devices may introduce propagation delays or the like which may degrade performance. Of course, hardware modifications could be made to support additional devices, however typical PCI specifications call for support of up to ten devices. In the preferred embodiment of the present invention, up to four removable devices may be supported, along with one or more fixed devices.

Each connector for a removable device may impose an additional propagation delay load for a total of eight equivalent device loads for four removable devices. In the preferred embodiment, secondary bus controller 120 may drive four removable PCI devices from secondary PCI bus 126. The preferred embodiment may be expanded to provide additional removable or fixed devices by providing additional register bits and associated logic and software support. Moreover, although illustrated in the preferred embodiment as a secondary PCI bus controller, secondary bus controller 120 may provide an interface to other types of expansion busses.

The register bits set forth in Table I are discussed below in connection with the present invention. Secondary bus controller 120 may require such register bits to support insertion/ejection architecture. These register bits are illustrated by way of example only and are not intended to limit the scope of the present invention.

TABLE I

| REGISTER BITS | DESCRIPTION |
| --- | --- |
| CHG_STS | Indicates status change following insertion/ejection. Notifies software for reconfiguration. Defaults to "0" on reset. |
| INSERT_EJECT_EN[3:0] | Controls whether a slot is enabled for hot insertion/ejection. For a given slot n, bit INSERT_EJECT_EN[n] must be set for an insert or eject even to be reported via INT#. Defaults to disabled value of "0000" on reset. |
| INSERT[3:0] | Set by software to notify secondary bus controller to initiate insertion. Defaults to no software initiated insertion status of "0000" on reset. |
| INSERT_REQ_STS[3:0] | Indicates a pending interrupt for Insertion. Defaults to "0000" on reset. |
| PRESENT[3:0] | Reflects the status of PRSNTS[3:0]# following debouncing. When set, slot is loaded, card is present; when cleared, slot is empty, card is absent. On reset, PRESENT[n] is set if PRSNTS[n]# is low and is cleared if PRSNTS[n]# is high. |
| SLOT_CLK_ENs[3:0] | controls PCICLKs[3:0]. When SLOT_CLK_ENs[n] is cleared, the PCICLKs[n] is held low; when SLOT_CLK_ENs[n] is set, PCICLKs[n] toggles and is synchronous to the primary PCI clock PCICLKp. Defaults to "1111" on reset to allow PCICLKs[3:0] to function for occupied slots. |
| SLOT_RST_ENs[3:0] | controls PCIRST[3:0]#. When cleared, the PCIRSTs[n]# follows PCIRSTp#; when SLOT_RST_ENs[n] is set, PCIRSTs[n]# is held low. Defaults to "0000" on reset to cause PCIRSTs[3:0]# to follow PCIRSTp#. |
| EJECT_REQ_STS[3:0] | Indicates a pending interrupt for Ejection for closing the resources. Defaults to no pending interrupt status of "0000" on reset. |
| EJECT[3:0] | Set by software to notify Secondary Bus controller to initiate ejection. Defaults to no software initiated ejection status of "0000" on reset. |

The signal names set forth in Table II are discussed below in connection with secondary bus controller 120 of the present invention. These signal names are illustrated by way of example only and are not intended to limit the scope of the present invention.

TABLE II

| SIGNAL NAME | DESCRIPTION |
| --- | --- |
| IREQ[3:0]#/EREQ[3:0] | A falling edge of IREQ[3:0]#/EREQ[3:0] with PRSNTS[n]# high indicates an insert request. A rising edge of IREG[3:0]#/EREQ[3:0] with PRSNTS[n]# low indicates an eject request. |
| PCICLKp | Clock input from the primary PCI bus; used as an internal clock. |
| PCIRSTp# | Reset signal input from the primary PCI bus; used as an internal reset. |
| PCICLKs | Secondary PCI clock for fixed PCI device(s). |
| PCICLKs[3:0] | PCI clocks for secondary PCI slots (or alternatively, for other fixed PCI devices) |
| PCIRSTs# | Secondary PCI Reset for fixed PCI device(s) |
| PCIRSTs[3:0]# | PCI resets for secondary PCI slots (or alternatively, for other fixed PCI devices). |
| PRSNTS[3:0]# | When asserted, indicates presence of a card. When de-asserted, indicates the absence of a card. Sampled during reset to determine which PCICLKs[3:0], PCIRSTs[3:0]#, and PCIGNTs[3:0]# signals are to be tri-stated or driven. |
| PCIGNTs# | PCI Bus Master grant control signal for stationary PCI device(s). |
| PCIGNTs[3:0]# | PCI Bus Master grant control signal for removable PCI devices. |
| SLOT_EN[3:0] | Used to control power-on/power-off to the slots and also to lock cards into slots. |
| INT# | Asserted by secondary bus controller to request an interrupt for an insert or eject event (active-low, open-drain). |
| GPIO[3:0] | Available as an additional control for the slots. |

Secondary bus controller 120 may interface with fixed PCI device 130 through secondary PCI bus 126. Fixed PCI device 130 may comprise a PCI device (e.g., hard drive controller, CD-ROM controller, modem, network card, display driver, or the like) which is not anticipated to be removed or inserted while the computer system is running. Note that the use of a fixed PCI device may be optional, and elimination of a fixed PCI device on one or more PCI expansion busses may allow for an increased number of removable PCI devices to be added.

Moreover, additional fixed PCI devices may be added, and the number of removable slots decreased. PCI device 130 may interface to secondary bus controller 120 through secondary PCI bus 126 and secondary PCI clock PCICLKs on line 127 and PCI reset signal PCIRSTs# on line 128. Note that in FIG. 1, the notation "s" generally indicates signals associated with secondary PCI bus 126, whereas the notation "p" indicates signals associated with primary PCI bus 104.

In addition to fixed PCI device 130, secondary bus controller 120 may drive up to four removable PCI expansion devices through connector 150 through secondary PCI bus 126. Again, while illustrated here as only four removable expansion devices through connector 150, additional removable expansion devices may be added by altering the number of register bits and/or by eliminated the use of a fixed PCI device. In addition, as discussed above, multiple secondary bus controllers 120 may be chained together or provided in parallel to allow for additional PCI expansion devices to be added to a computer system.

In order to facilitate illustration of the present invention, only one connector 150 and associated hardware for removable devices are illustrated in FIG. 1. However, the notation [3:0] in FIG. 1 illustrates that connector 150 and associates hardware may be replicated for four removable devices (i.e., devices 0, 1, 2, and 3). Further discussion of the elements of FIG. 1 will be discussed in connection with reset, insertion, and removal sequences.

Reset Sequence

Upon power-up or reset, a number of events may take place within the system of FIG. 1 to enable hot insertion and ejection (collectively, "hot swapping"). System controller 103 asserts primary PCI reset PCIRSTp# on line 110 and starts primary PCI clock PCICLKp on line 109. Secondary bus controller 120 may then assert an internal reset and reset configuration bits from Table I to default values.

Secondary bus controller 120 may then assert secondary PCI reset signals PCIRSTs[3:0]# and PCIRSTs# for as long as primary PCI reset signal PCIRSTp# is asserted. As such, secondary fixed PCI device(s) 130 and removable PCI devices coupled to connector 150 are reset. PCIRSTp# active time may be a minimum of 1 msec, allowing the internal clock and phase locked loop (PLL) within secondary bus controller 120 sufficient time to synchronize.

Secondary bus controller 120 may then allow secondary PCI clock signals PCICLKs[3:0] and PCICLKs to toggle, since SLOT_CLK_EN[3:0] defaults to "1111". During reset, secondary bus controller 120 samples signal PRSNTS [3:0]# and stores the status of those signals as bits PRESENT[3:0], and turns on power to loaded slots by asserting appropriate SLOT_EN[3:0] signals 144. For each empty slot n, secondary bus controller 120 tri-states the corresponding PCICLKs[n], PCIRSTs[n]#, and PCIGNTs [n]# signals.

At boot, the BIOS of secondary bus controller 120 will read the status of PRESENT[3:0] and write a "1" to set SLOT_RST_ENs[3:0] accordingly to activate PCIRSTs [3:0]# for unloaded slots. Finally, the BIOS of secondary bus controller 120 sets INSERT_EJECT_EN[3:0] to enable insertion and ejection. This last step may be enabled or disabled as a security feature to prevent unauthorized insertion or and/or ejection of removable devices.

Insertion Sequence

Figure 3:
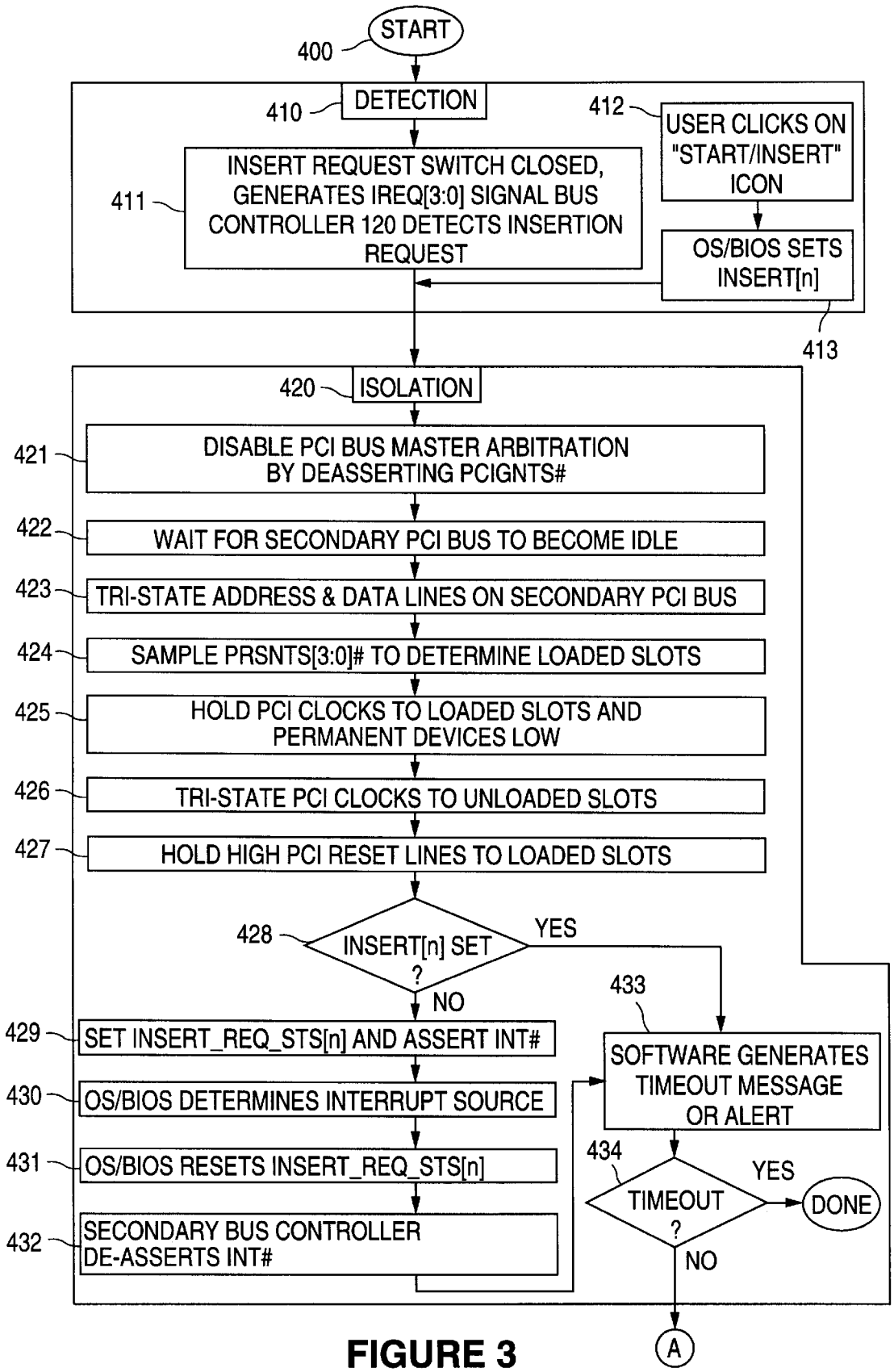
FIG. 3 is a first portion of a flowchart illustrating the operation of the apparatus of the present invention and associated interrupt handler during the insertion process.
Figure 4A:
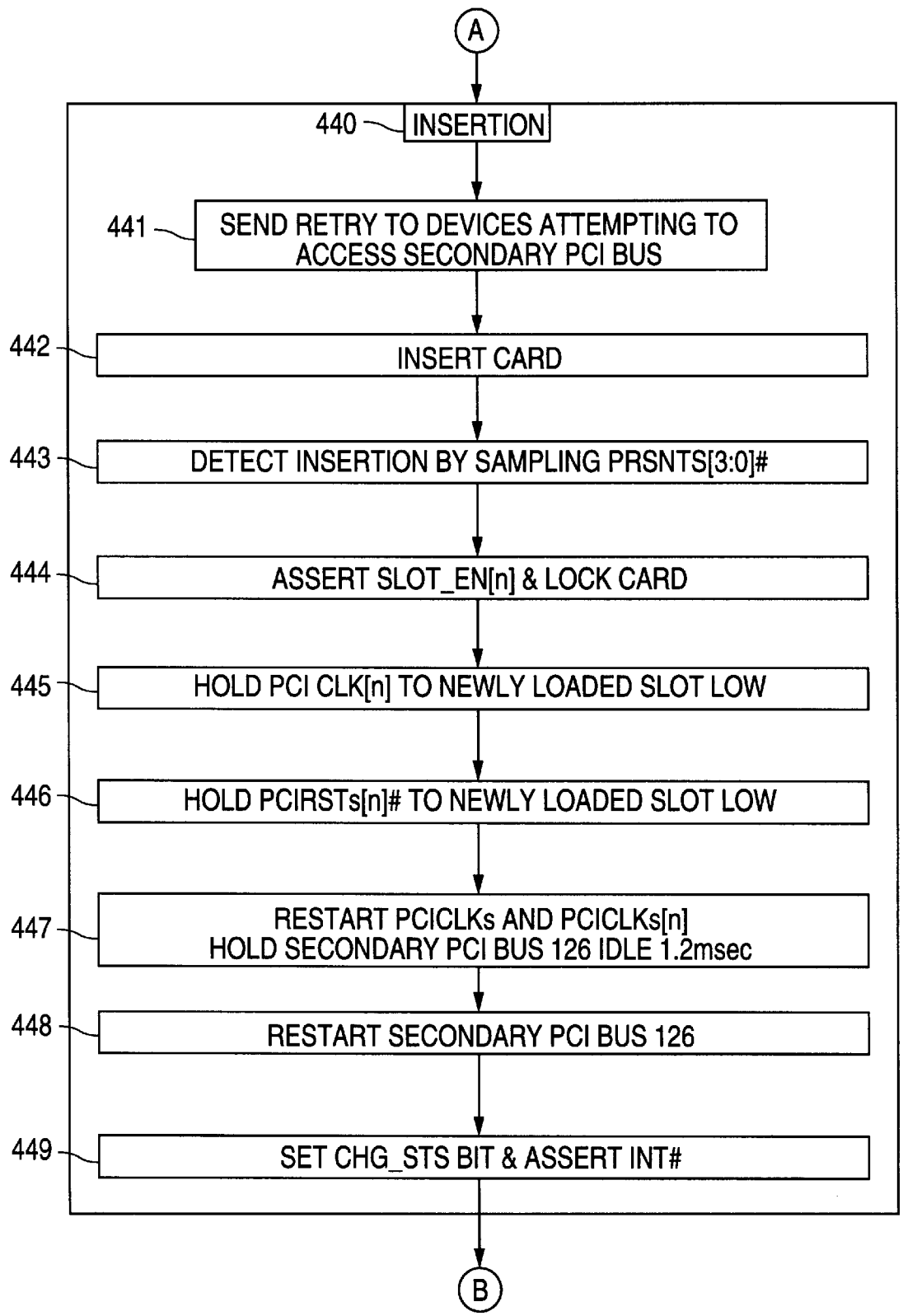
FIG. 4a is a second portion of a flowchart illustrating the operation of the apparatus of the present invention and associated interrupt handler during the insertion process.
Figure 4B:
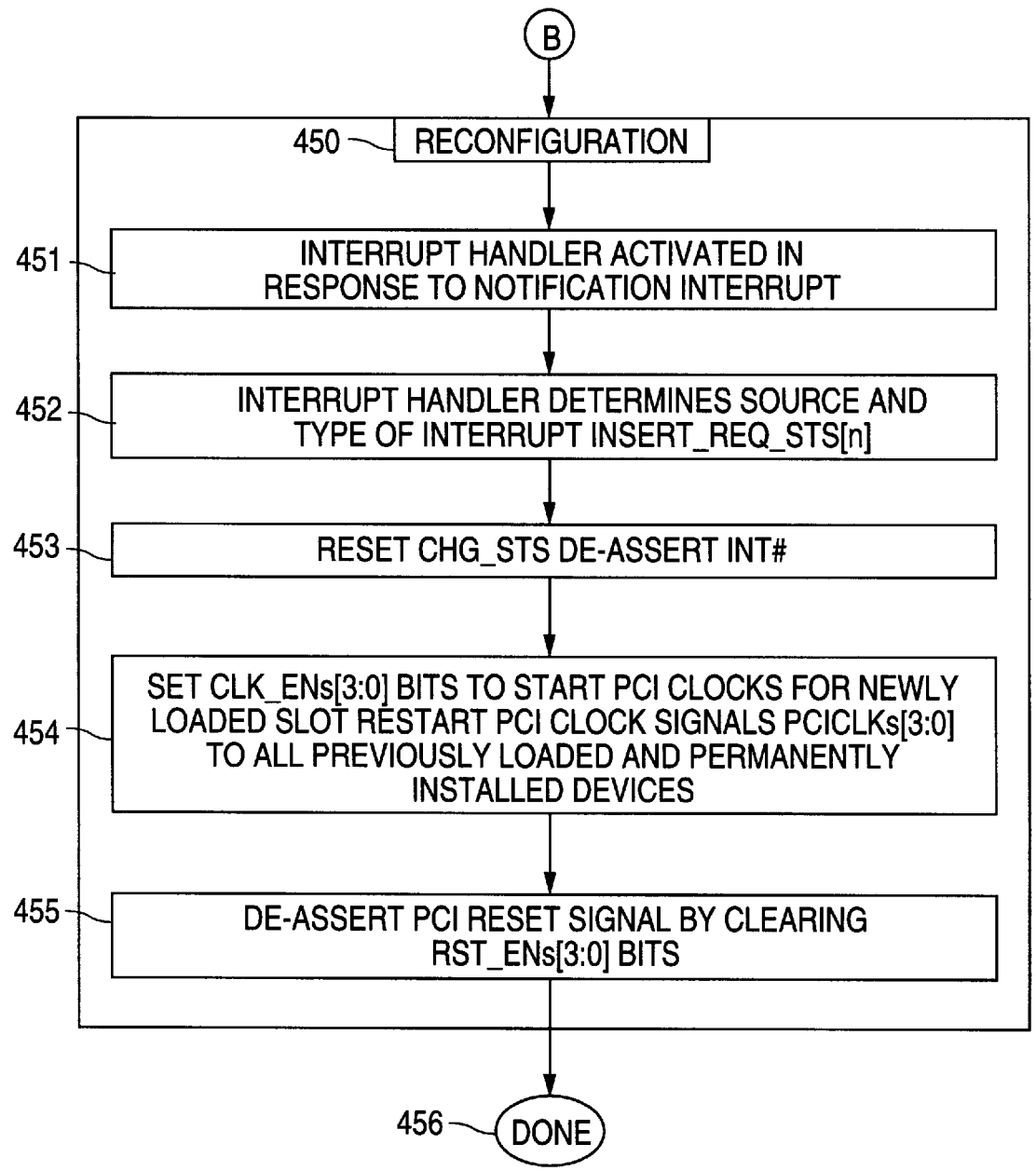
FIG. 4b is a third portion of a flowchart illustrating the operation of the apparatus of the present invention and associated interrupt handler during the insertion process.

A "hot" insertion sequence may comprise four steps; detection, isolation, insertion, and reconfiguration. For the purposes of discussion of the present invention, signals on various pins to and from secondary bus controller 120 are shown in capital letters, whereas register bits are indicated in capital italics. FIGS. 3, 4a and 4b form a flowchart illustrating elements in the four steps of the insertion sequence, beginning with start step 400.

A first step 410 of the hot insertion sequence is detection. Detection step 410 may be performed automatically or manually. Automatic detection may be achieved through the use of proximity switches or contact switches sensing the imminent insertion of a device card or the like. Alternately, other means may be utilized (e.g., a number of longer pins or contacts on a card, as in Lien et al, supra) to assert detection.

As illustrated in FIG. 1, eject switch EJECT[3:0] S1 141 and insert switch INSERT[3:0] S2 143 may be connected in series. Each slot may be provided with corresponding insert and eject switches. Insert switches 143 may comprise a proximity switch or the like (e.g., optoelectric, contact switch, hall effect, or the like) which may be closed when a device is inserted into a corresponding slot.

Each eject switch 141 may comprise a normally closed intermittent (e.g., spring loaded) manual user switch associated with or placed in proximity with a particular slot. When a user wishes to eject a device, the user may manually press a corresponding eject switch. Closing of insert switch 143 or opening of eject switch 141 may generate insert or eject request IREQ[3:0]#/EREQ[3:0]. By placing eject and insert switches in series, the number of pins required by secondary bus controller 120 for insert and eject requests may be minimized.

TABLE III

| EJECT SWITCH | INSERT SWITCH | Voltage on Line 122 |
|---|---|---|
| CLOSED | OPEN | Vcc |
| CLOSED | CLOSED | Ground |
| OPEN | OPEN | Vcc |
| OPEN | CLOSED | Vcc |

Table III illustrates a truth table for the signal on line 122 for various positions of switches 141 and 143. Eject switch 141 is normally closed and insert switch 143 is normally open. Under such circumstances, line 122 is pulled high by system voltage 140 through a shunt resistor. When insert switch 143 is closed, voltage on line 122 is pulled low, the transition indicating the presence of a device in a corresponding slot.

If eject switch 141 is activated while insert switch 143 is open, voltage at line 122 should remain high. Such a situation is a null condition, as a user cannot eject an empty slot. However, if insert switch 143 is closed and eject switch 141 is opened, voltage on line 122 will transition from low to high. Thus the transition from high to low on line 122 indicates an insertion for a corresponding slot, while a transition from low to high indicates an eject request.

Such edge detection allows two signals to be placed on one line 122 and thus conserve pins on secondary bus controller 120. Table IV summarizes the edge detection scheme for line 122.

TABLE IV

| Transition | Signal | Description |
|---|---|---|
| Low to High | EREQ[3:0] | Eject Request |
| High to Low | IREQ[3:0]# | Insertion Event |

It should be noted that in place of the edge detection technique of TABLE IV, a level detecting technique may be used where different lines are used for insert and eject signals.

As illustrated in FIGS. 1, 3 and 4, insert request switch S2 143 may pull IREQ[3:0]#/EREQ[3:0] low to generate signal IREQ[3:0]# on lines 122 for a corresponding slot as illustrated in step 411. When signal IREQ[3:0]# on lines 122 has been asserted and a corresponding INSERT_EJECT_EN [n] bit has been set, secondary bus controller 120 detects that a hot insertion sequence is to begin.

Alternately, step 411 of FIG. 3 may be accomplished through software as illustrated in step 412. For example, a user may click on a "start/insert" icon in a graphical user interface such as Windows 95, Windows NT, OS-2 or the like. OS/BIOS may then set bit INSERT[n] in secondary bus controller 120, indicating a software initiated insert has been requested.

The second step 420 in the hot insertion sequence is isolation of secondary PCI bus 126 and devices coupled thereto. Secondary PCI bus 126 is a synchronous bus which supports bus mastering. In other words, various devices on secondary PCI bus 126 may be granted control of secondary PCI bus 126 by insertion controller 120 for purposes of transmitting or receiving data. Such bus mastering techniques may be used to increase data bandwidth on a bus. As such, it may be necessary for secondary bus controller 120 to reassert control over secondary PCI bus 126 before hot insertion can take place.

During isolation step 420, secondary bus controller 120 de-asserts PCI bus mastering in step 421 by deasserting signals PCIGNTs# and PCIGNTs[3:0]# on lines 132 and 131, respectively. Secondary bus controller 120 waits for whichever device on secondary PCI bus 126 which has bus master control to complete its cycle. Secondary bus controller 120 then waits for secondary PCI bus 126 to become idle in step 422. Secondary bus controller 120 then disables arbitration on secondary PCI bus 126, preventing any device on secondary PCI bus 126 from being granted bus master control.

Secondary bus controller 120 may then tri-state the address and data lines on secondary PCI bus 126 in step 423. Secondary bus controller 120 then holds PCI clock PCICLKs on line 127 to non-removable PCI device 130 low in step 425. PCI clocks PCICLKs[3:0] on lines 124 to all loaded slots on connector 150 are also held low in step 425. Whether a particular slot is loaded or unloaded may be determined by sampling the presence signal PRSNTS[3:0]# signals on lines 123 as illustrated in step 424. If signal PRSNTS[n]# and signal IREQ[n]#/EREQ[n] is low, then slot n is loaded. If signal PRSNTS [n]# is high, then slot n is empty.

PCI clocks PCICLKs[3:0] on lines 124 to unloaded slots continue to be tri-stated and PCI reset signals PCIRSTs [3:0]# on lines 125 to loaded slots are maintained high (de-asserted) in steps 426 and 427 respectively. In this manner, devices which are presently active on secondary PCI bus 126 may be temporarily put in a stasis condition such that any spurious signals which occur during the insertion process are ignored.

If INSERT[n] is set (i.e., software initiated the insertion), as indicated in step 428, processing passes to step 433. If INSERT[n] is not set (i.e., hardware initiated insertion), secondary bus controller 120 may set a corresponding INSERT_REQ_STS[n] bit and assert notification interrupt INT# on line 108 to notify operating system software that a hardware initiated insertion has been requested. Such hardware initiated insertion interrupts may be disabled by setting a configuration bit within secondary bus controller 120 if the present invention is to be utilized in a system without hardware switches.

In step 430, the operating system BIOS determines the source of the interrupt. In step 431, operating system BIOS resets the INSERT_REQ_STS[n] bit and secondary bus controller 120 in step 432 de-asserts INT#.

In step 433, operating system software or applications software may generate a user prompt message (e.g., "insert card now") and/or start an insertion timer. Such an insertion timer may be used to prevent a system from hanging if a card is not inserted or inserted improperly. If the insertion timer times out in step 434, the user is notified that the insertion process is incomplete. Otherwise, the insertion step is ready to occur.

Thus, during insertion, notification interrupt INT# 108 may be inserted twice, initially for insertion time-out, and later for system re-configuration. The first insertion interrupt may be disabled through software by setting an appropriate register bit.

During the insertion process 440, primary PCI bus 104 and host bus 102 remain active. Attempts to access devices on secondary PCI bus 126 will be denied during the insertion process. Secondary bus controller 120 will respond to attempts by devices on the primary bus with a retry command to primary bus devices attempting to access devices on secondary PCI bus 126 during the insertion process as illustrated in step 441. If insert switch 143 is automated (i.e., a proximity or other type of card-sensing switch is used), it is expected that the insertion process will take no more than 100 to 200 mS. Most applications software should be able to accept such a delay without difficulty.

Software running on processor 101 will continue to attempt retries of access until a timeout condition occurs. To prevent data loss or system hangup or crash, software operating on processor 101 may be modified to extend timeout periods to allow for insertion of devices. Note that primary PCI bus clock PCICLKp on line 109 is not stopped during the insertion process, and thus secondary bus controller 120 remains active throughout the insertion process.

Once secondary PCI bus 126 has been isolated, insertion may take place in step 442. A card(s) or other device(s) may be inserted into connector 150, which, as discussed above, may comprise four connector slots in the preferred embodiment. Note that for the purposes of this application, the removable devices are described as being cards or the like. However, the devices may take other formats, such as PCMCIA type cards (i.e., credit card size devices with a specialized plug or interface), so-called "smart cards", or the like. The present invention is in no way intended to be limited to card insertion in a backplane or motherboard.

Once a device has been inserted into connector 150, secondary bus controller 120 decodes the presence of the newly loaded device by sampling presence signal PRSNTS [3:0]# on lines 123 in step 443 after debouncing the PRSNTS[n]# line for two seconds, to insure the card is properly seated. Presence signal PRSNTS[3:0]# on lines 123 may be a logical combination of signal PRSNT1S[3:0]# on lines 145, and PRSNT2S[3:0]# on lines 146. Note that in the nomenclature used in the present application, the # sign indicates an active low signal, as is known in the art.

Signals PRSNT1S[3:0]# and PRSNT2S[3:0]# are known in the art in PCI bus type systems. Signals PRSNT1S[3:0]# and PRSNT2S[3:0]# together indicate what type of power requirements a device has. If both signals PRSNT1S[3:0]# and PRSNT2S[3:0]# for a given slot (i.e., slot 0–3) are high, then no card in inserted in that slot. Other combinations of signals (i.e, 00, 10, 01) indicate different power level requirements (e.g., 5 watts) for a given device. Signals PRSNT1S[3:0]# and PRSNT2S[3:0]# do not require power as they may be passively generated by a device (e.g., grounding a pin or contact).

Signals PRSNT1S[3:0]# and PRSNT2S[3:0]# may be ANDed by ANDing Function Logic 151 to generate presence signal PRSNTS[3:0]# on lines 123. If presence signal PRSNTS[3:0]# is high for a given slot, no card is present in that slot. If presence signal PRSNTS[3:0]# is low, either insertion has not been requested, or no card is present in that slot.

Note that the AND gate logic illustrated in FIG. 1 is schematic only. Actual logical hardware implementation may be varied without departing from the spirit and scope of the present invention. Note also that signals other than signals PRSNT1S[3:0]# and PRSNT2S[3:0]# may be monitored for card presence, and that the present invention may not be limited to a PCI bus embodiment.

Figure 2:
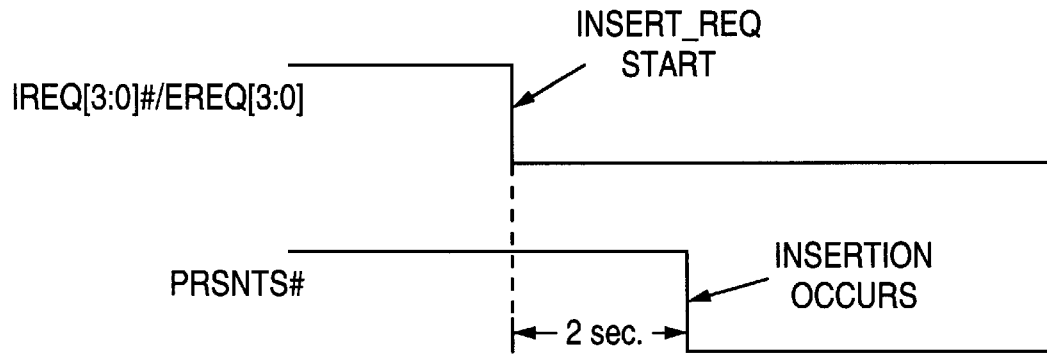
FIG. 2 is a waveform diagram illustrating signals in the system of FIG. 1 upon insertion and ejection of a device.

FIG. 2 illustrates the operation of presence signal PRSNTS[3:0]# on lines 123 for a given slot, and insert/eject request signal IREQ[3:0]#/EREQ[3:0] on line 122 for the same given slot. Once an insert request has been initiated by closing insert request switch 143, signal IREQ[3:0]#/EREQ [3:0] may go low as illustrated in FIG. 2. Some time later, (e.g., two seconds) when a card has been seated and debounced, signal PRSNTS# for that slot will go low, also as illustrated in FIG. 2.

Once card insertion has been detected, secondary bus controller 120 may assert SLOT_EN[n] for the newly inserted card in step 444. Signal SLOT_EN[n] may switch SCR or other switching device 180 to supply system voltage Vdd to the newly inserted card. Optionally, GPIO bus 133 may lock the newly inserted card in place.

In step 445, PCICLK[n] to the newly loaded slot is held low. In step 446, PCIRSTs[n]# to the now powered newly loaded device is also held low. Steps 445 and 446 are performed by hardware in secondary bus controller 120 after power has been applied by SCR or other switching device 180. Using a hardware solution may be preferable to software to insure that the newly inserted device is powered and reset properly.

In step 447, PCI clocks PCICLKs and PCICLKs[n] for the secondary bus are restarted. The secondary PCI BUS 126 may be held idle 1.2 msec.

Once insertion has occurred, reconfiguration may take place. Reconfiguration commences when secondary bus controller 120 activates the interrupt handler operating in operating system or BIOS of processor 101 via notification interrupt INT# 108 as illustrated in step 451 of FIG. 4b. The interrupt handler then decodes the source of the interrupt in step 452. If bit CHG_STS in secondary bus controller 120 is set, the interrupt handler may detect that a change status interrupt has been generated. If an insert interrupt has occurred, the interrupt handler may then determine the newly loaded slot by reading the bits INSERT_REQ_STS [n] in secondary bus controller 120 as illustrated in step 452.

The insert interrupt may then lock the newly loaded slot via electro-mechanical lock using general purpose interface GP I/O bus 133. This locking step is entirely optional and may be eliminated if not required. In the preferred embodiment, a card lock may be provided to prevent spurious ejection of device cards or the like. Note that the card lock hardware does not form a part of the core of the present invention.

In step 453, OS/BIOS resets the CHG_STS bit and secondary bus controller 120 de-asserts notification interrupt INT# 108.

In step 454, PCI clock signal PCICLKs[n] for the newly loaded slot or slots, as well as previously loaded slot(s), are started by setting SLOT_CLK_ENs[3:0] bits for loaded slots in secondary PCI bus controller 120. The interrupt handler compares the PRESENT[3:0] bits to previously stored values in main memory to identify which slot(s) are newly loaded. Although illustrated here as a software enabled step, in an alternative embodiment, restart of the secondary PCI clock for newly loaded slot(s) may be implemented in hardware or firmware. In step 455, OS/BIOS de-asserts PCI reset signal PCIRSTs[n]# for newly loaded slot(s) by clearing SLOT_RST_ENs[n] bits corresponding to newly loaded slot(s) in secondary PCI bus controller 120. Secondary PCI bus controller 120 may delay de-assertion of PCIRSTs[n]# until secondary PCI bus 126 is idle. OS/BIOS then reconfigures the system to incorporate the newly inserted device(s).

Once secondary PCI bus 126 is reactivated, secondary arbitration may be enabled. Secondary PCI bus controller 120 may clear any internal conflicts on secondary PCI bus 126 initially. Operating system software on processor 101 may then reconfigure the system for the new hardware configuration. Arbitration of hardware and software resources may be allocated and conflicts eliminated. Such conflict resolution for operating system software is described, for example, in the Plug and Play specification entitled, "Plug and Play ISA Specification, Version 1.0a" dated May 5, 1994, and incorporated herein by reference. The Plug and Play specification is also discussed, for example, in co-pending U.S. patent application Ser. No. 08/371,304, filed Jan. 11, 1995, entitled "BACKWARD COMPATIBILITY FOR PLUG AND PLAY SYSTEMS", assigned to the same assignee as the present application and incorporated herein by reference.

Arbitration of resources may or may not require complete re-configuration of the computer system, depending upon whether a conflict for resources is detected. If the newly inserted device conflicts with a previously present device, it may be necessary to reconfigure both or more devices in order to eliminate resource conflicts. Once the system has been reconfigured, the insertion process is complete.

Ejection Sequence

Figure 5:
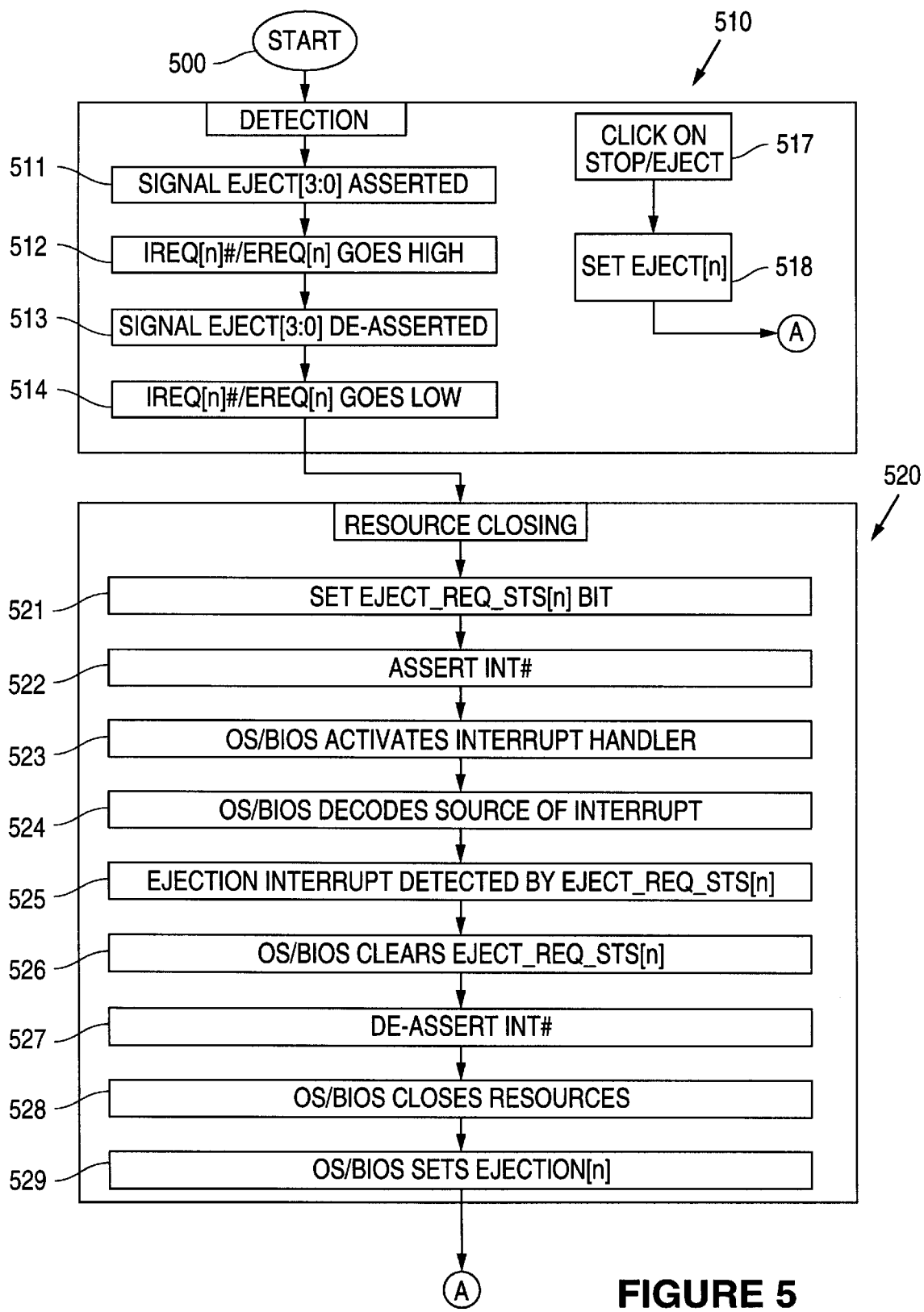
FIG. 5 is a first portion of a flowchart illustrating the operation of the apparatus of the present invention and associated interrupt handler during the ejection process.
Figure 6A:
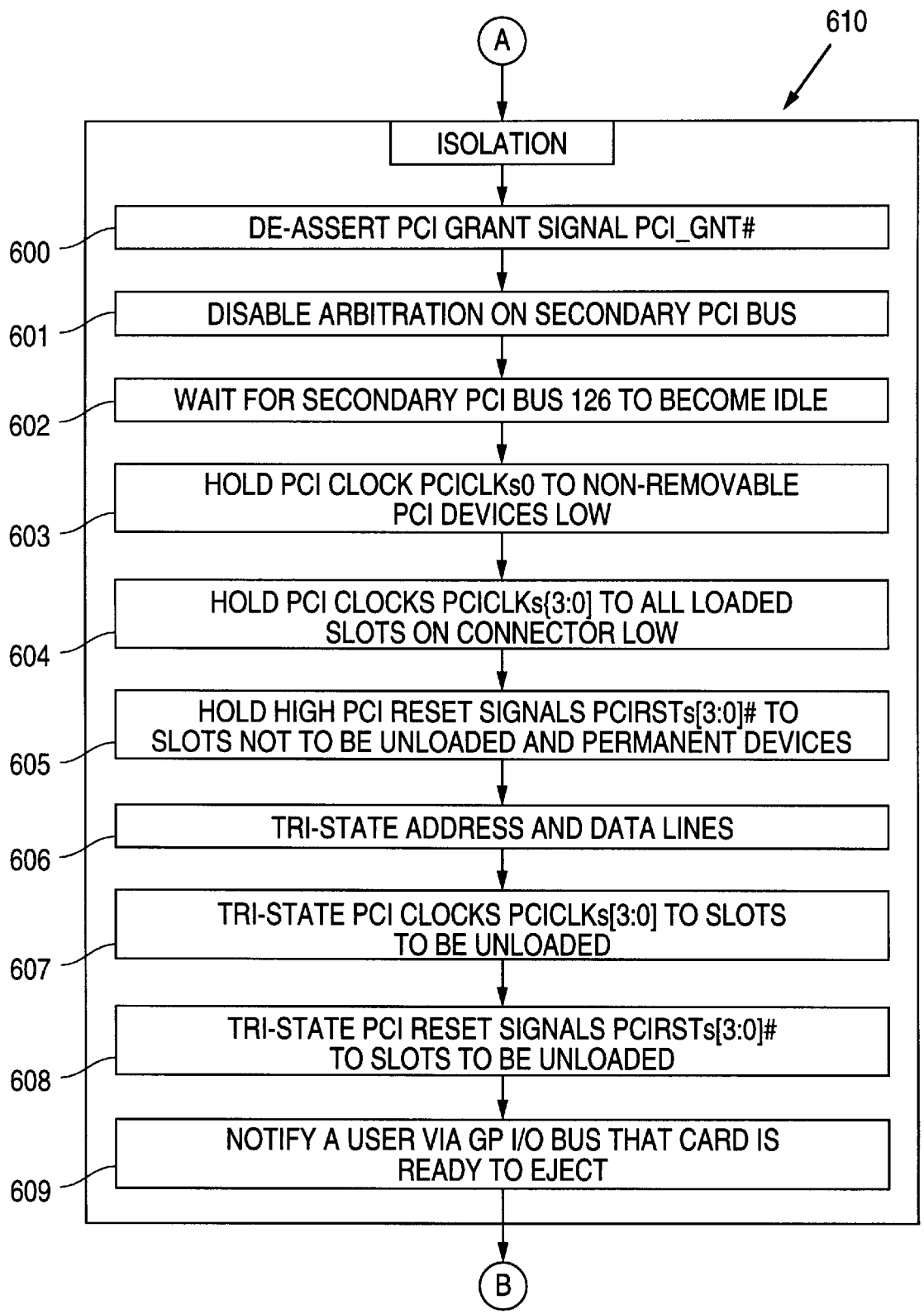
FIG. 6a is a second portion of a flowchart illustrating the operation of the apparatus of the present invention and associated interrupt handler during the ejection process.
Figure 6B:
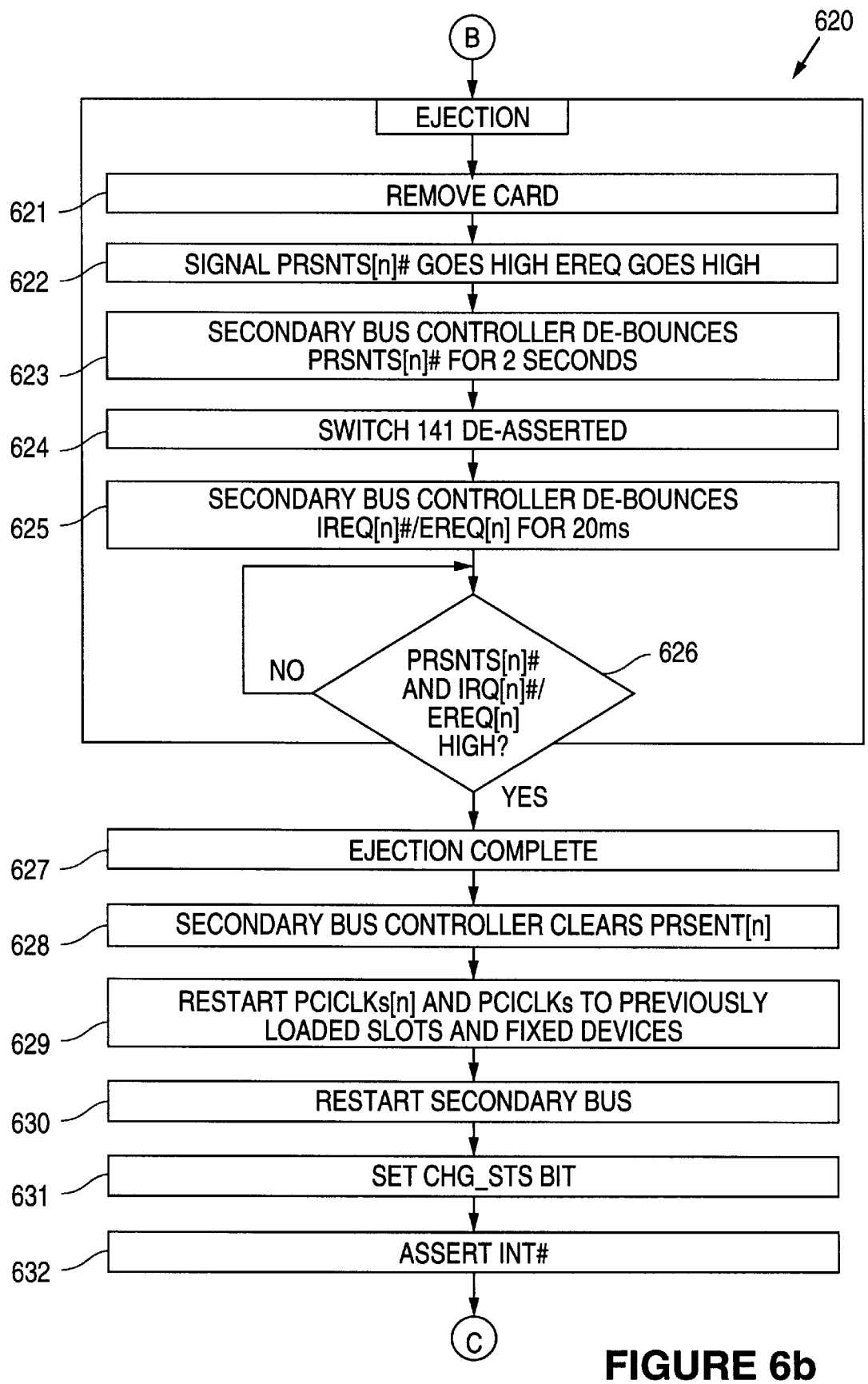
FIG. 6b is a third portion of a flowchart illustrating the operation of the apparatus of the present invention and associated interrupt handler during the ejection process.
Figure 6C:
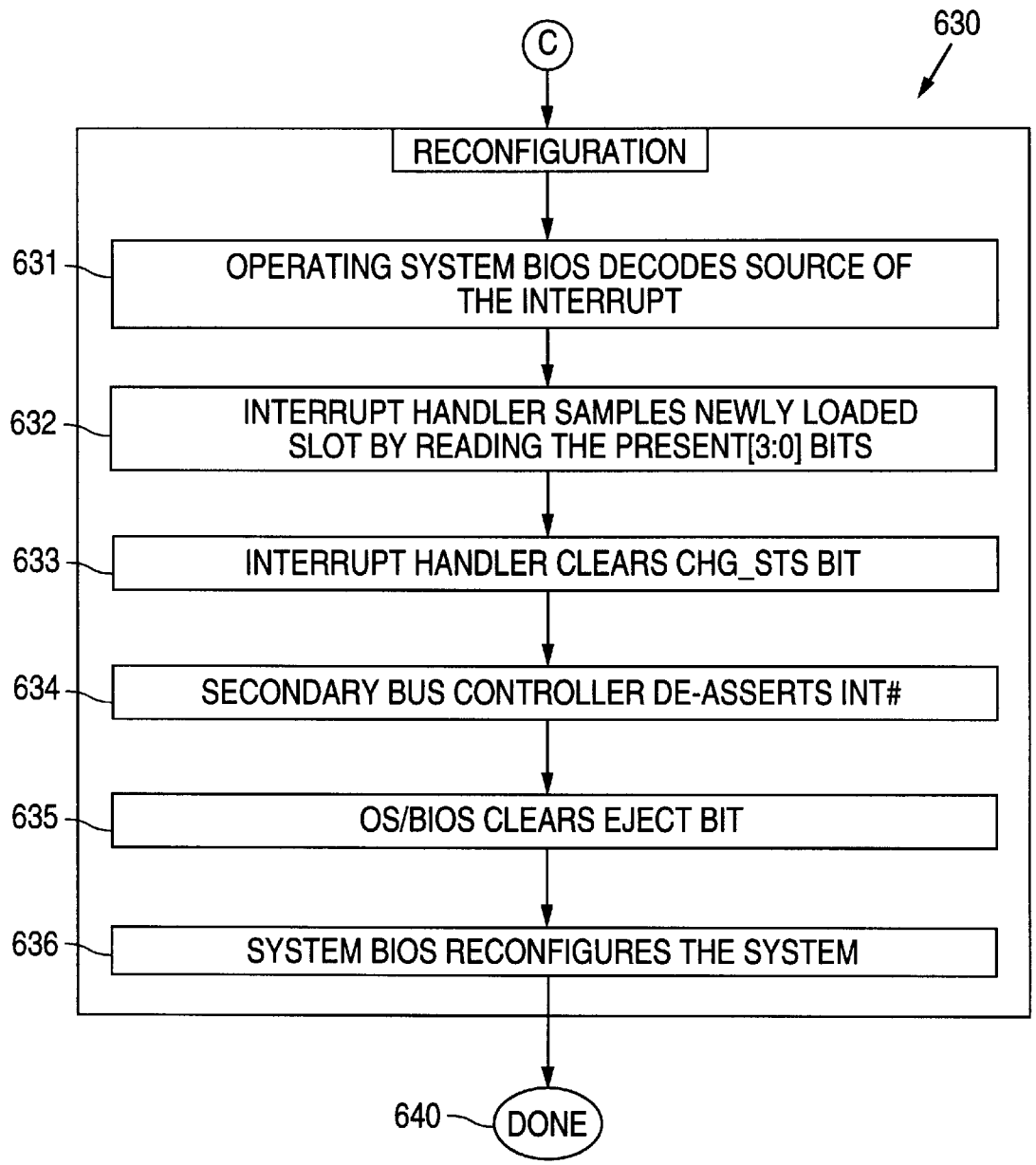
FIG. 6c is a fourth portion of a flowchart illustrating the operation of the apparatus of the present invention and associated interrupt handler during the ejection process.

The hot ejection sequence may be defined by the following five steps; detection, resource closing, isolation, ejection, and re-configuration. The five steps in the hot ejection sequence are illustrated in FIGS. 5, 6a, 6b, and 6c. FIG. 5 illustrates detection and resource closing steps, whereas FIGS. 6a, 6b, and 6c illustrate isolation, ejection and re-configuration steps.

In FIG. 5, the hot ejection sequence is illustrated beginning with START step 500. Detection may occur when signal EJECT[3:0] is asserted in step 511, opening ejection request switch 141. Ejection request switch 141 may comprise a normally closed momentary switch (e.g., spring loaded) which may be activated by a user. Alternately, an electrical signal or the like represented by EJECT[3:0] may open ejection request switch 141. In step 512, signal IREQ [n]#/EREQ[n] is pulled high on line 122. In step 513, signal EJECT[3:0] is de-asserted (i.e., ejection request switch 141 is released) and in step 514, signal IREQ[n]#/EREQ[n] goes low. As discussed above, secondary bus controller 120 detects this edge transition on line 122 and in combination with signal PRSNTS[3:0]# detects that an ejection request has occurred.

Alternately, as illustrated in FIG. 5, a user may click on a "stop/eject" icon through software in step 517. Secondary bus controller 120 then may set EJECT[n] bit in secondary bus controller 120 implying that a resource has been closed. Processing then passes to step A in FIG. 6a, skipping the resource closing step.

Once an ejection interrupt has been detected, interrupt handler in processor 101 may then close resources to be ejected. Applications software accessing a device to be ejected must be closed before the device can be ejected, otherwise software crash or hang may take place. Client applications using the resource to be ejected may be notified by processor 101 to complete their transactions with the resource to be closed. For example, if a client is accessing a data file from a removable hard drive attached to connector 150, the client may be asked to close that data file. Which resources are to be closed may be detected by examining the EJECT_REQ_STS[3:0] bits.

Once detection has occurred, resources may be closed. Secondary PCI controller 120 sets the EJECT_REQ_STS [n] bit corresponding to the received rising edge of IREQ [n]#/EREQ[n] indicating an ejection interrupt is to occur in step 521. In step 522, secondary bus controller 120 asserts notification interrupt INT# 108 signalling processor 101 of an interrupt. In step 523, OS/BIOS activates the interrupt handler and in step 524 decodes the source of the interrupt.

Processor 101 determines an ejection interrupt has been requested from the status of EJECT_REQ_STS[n]. In response to an ejection interrupt, OS/BIOS clears the EJECT_REQ_STS[n] in step 526. In response, secondary bus controller 120 de-asserts notification interrupt INT# 108 in step 527. In step 528, OS/BIOS closes resources on secondary PCI bus 126 to be ejected. Once resources to be ejected have been closed, OS/BIOS sets EJECT[n]. Setting EJECT[n] causes the secondary bus controller 120 to start the isolation process discussed in FIG. 6a.

Once resources to be ejected have been closed, the CLS_RES_REQ[3:0] bit(s) may be cleared as illustrated in step 525. Operating system software running on processor 101 may be modified to prevent a client from subsequently re-opening the resource to be ejected once it has been closed. Without such a provision, it may be possible that client software may re-open the resource during the window between resource closing and device ejection. Once the resource has been closed, the ejection interrupt is completed, as illustrated in step 526.

Once resource closing has occurred, isolation may take place as indicated by steps 610 in FIG. 6a. Steps 600–609 illustrate the isolation steps for the hot removal process. The isolation step for ejection is similar to that for insertion. During the isolation step, secondary bus controller 120 de-asserts PCI bus mastering in step 600 and waits for whichever device on secondary PCI bus 126 which has bus master control to complete its cycle.

Secondary bus controller 120 may then disable arbitration on secondary PCI bus 126 in step 601, preventing any device on secondary PCI bus 126 from being granted bus master control. Secondary bus controller 120 then waits for secondary PCI bus 126 to become idle in step 602.

Secondary bus controller 120 then holds PCI clock PCICLKs on line 127 to non-removable PCI device 130 low in step 603. PCI clocks PCICLKs[3:1] on lines 124 to all loaded slots on connector 150 are also held low in step 604. Whether a particular slot is loaded or unloaded may be determined by sampling the presence signal PRSNTS[3:0]# signals on lines 123, EJECT_REQ[3:0] and INSERT_REQ [3:0].

PCI reset signals PCIRSTs[3:0]# on lines 125 to slots not to be unloaded and permanent devices are held high in step 605. Secondary bus controller 120 may then tri-state the address and data lines on secondary PCI bus 126 in step 606. PCI clocks PCICLKs[3:1] on lines 124 to slots to be unloaded are then tri-stated along with PCI reset signals PCIRSTs[3:1]# on lines 125 to slots to be unloaded in steps 607 and 608. In this manner, devices which are to remain on secondary PCI bus 126 may be temporarily put in a stasis condition such that any spurious signals which occur during the ejection process are ignored.

During the ejection process, host bus 102 and primary PCI bus 104 remain running. Primary PCI bus devices attempting to access devices on secondary PCI bus 126 are responded to with a retry termination by secondary PCI controller 120. Ejection may introduce a latency of 100 to 200 mS for accessing secondary targets of for a secondary master to initiate transactions. Software operating on host processor 101 may be modified to prevent timeouts or system hangups during this latency period.

Secondary PCI controller 120 may then notify a user via GP I/O bus 133 that a particular card is ready to eject in step 609, completing the isolation process 610. For example, red and green LEDs may be provided adjacent to each slot indicating whether it is permissible to eject a card (e.g., that all resource applications have been closed, secondary bus in stasis, and the like). Once the green LED is lit, a technician or user may then remove the associated card.

Alternately, a software indication (e.g., icon, text message, audio tone or voice announcement) generated by host processor 101 may indicate that a particular card is ready for ejection.

Once isolation process 610 has been completed, ejection process 620 may begin. In step 621 card removal may take place. If a card lock is to be used, GP I/O bus 133 may signal the card lock to release the card to be ejected at the appropriate time, or a spring mechanism or the like may physically eject the card to be ejected.

As discussed above, once eject switch 141 is activated, signal PRSNTS[n]# and EREQ amy go high, as indicated in step 622. Secondary bus controller 120 may then de-bounce PRSNTS[n]# for two seconds while the device is being ejected. When eject switch 141 is de-asserted in step 624, secondary bus controller 120 may then de-bounce IREQ[n] #/EREQ[n] for 20 mS.

When both PRSNTS[n] and IREQ[n]#/EREQ[n] are sampled high in step 626, physical ejection id determined to be complete, as noted in step 627. Once the device is physically ejected, secondary bus controller 120 clears the PRESENT[n] bit in step 628 and restarts PCICLKs[n] and PCICLKs to previously loaded slots and fixed devices in step 629.

In step 630, secondary bus 126 is restarted. Secondary bus controller 120 sets the CHG_STS bit indicating a change of status in step 631 and asserts notification interrupt INT# 108 in step 632. The system is now ready for reconfiguration.

Once ejection is complete, the reconfiguration may take place. In step 631, notification interrupt INT# 108 is received by processor 101. In step 631, the operating system BIOS decodes the source of the interrupt. Processor 101 may determine that a reconfiguration is requested by sampling the CHG_STS bit.

In step 632, the interrupt handler samples the newly unloaded slot by reading the PRESENT[3:0] bits to determine which slot has been unloaded and confirm that the slot has in fact been unloaded. Once the slot has been unloaded, the interrupt handler clears the CHG_STS bit in step 633. In step 634, secondary bus controller de-asserts notification interrupt INT# and in step 635, OS/BIOS clears the EJECT [n] bit, signalling the end of the ejection process.

Finally the operating system BIOS in processor 101 may reconfigure the system in step 636 by removing the resource allocations for the removed device from the system. Typically, such removal may not require reconfiguration of the entire system, as removal of a resource generally will not create device conflicts. Step 640 indicates the completion of the hot ejection process.

Figure 7:
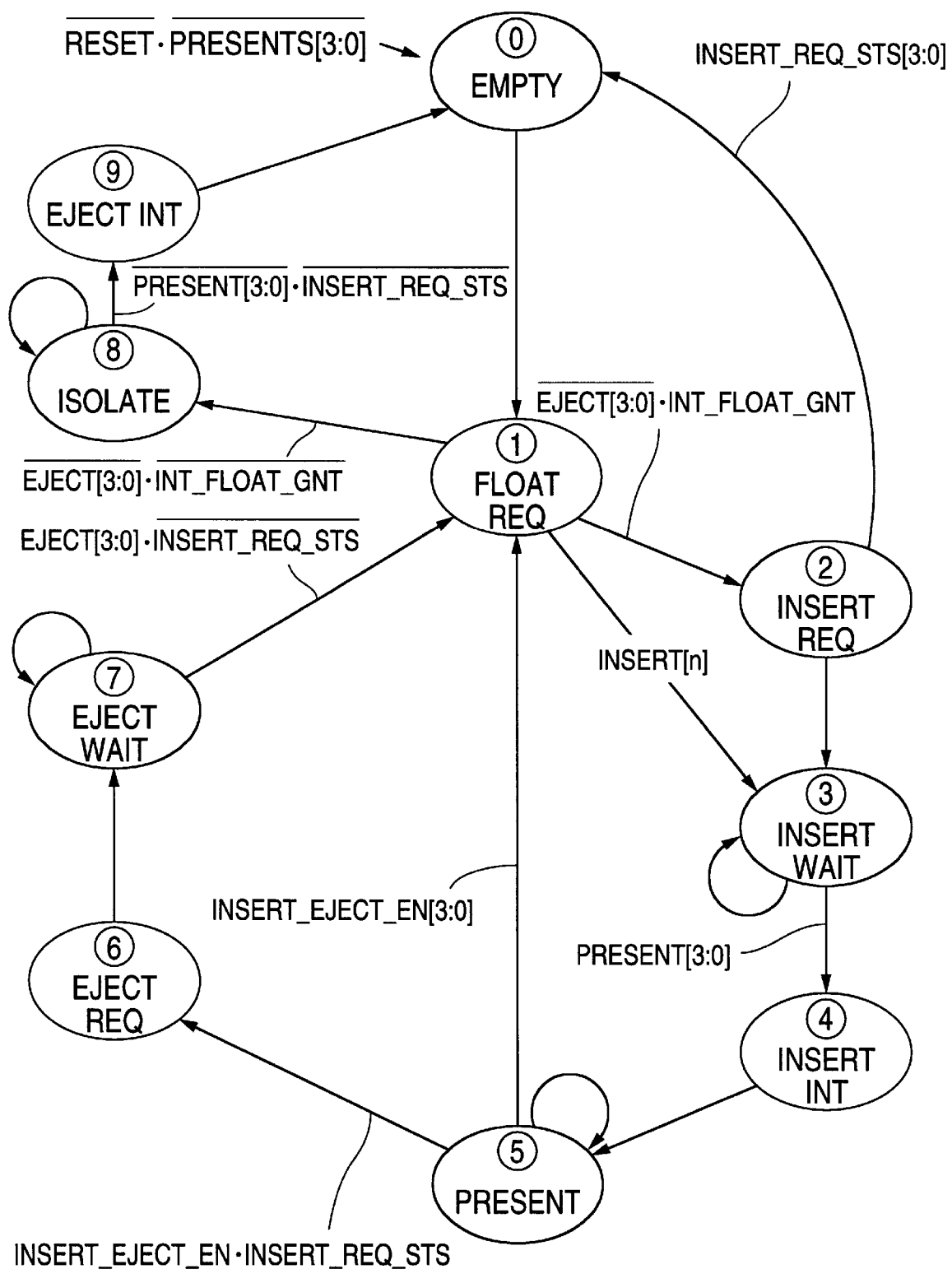
FIG. 7 is a State Diagram illustrating the operation of the present invention.

FIG. 7 illustrates a state diagram for the software of FIGS. 3, 4a, 4b, 5, and 6a–c. Insertion may be represented by the transition from empty state 0 to loaded (PRESENT) state 5. State 0 represents an empty slot state entered when reset is de-asserted and PRESENT[3:0] indicates an empty slot. When insertion it to take place, secondary bus controller 120 deactivates secondary PCI bus mastering in state 1. A hardware initiated insert is indicated by the transition to state 2, once the secondary PCI bus is inactive and if no ejection request has been made.

If a software initiated insert may occur as indicated by the transition from state 1 to state 3. In state 3 an insert timeout may occur, as discussed above, to allow time for a card insertion while preventing a system hangup if the card is not inserted or inserted improperly. State 4 represents the insert interrupt. Host processor 101 is notified and the system is reconfigured once presence of a newly inserted card is detected by the status of PRESENT[3:0] bits. Once the interrupt is complete, a transition is made to loaded slot state (PRESENT) 5.

Ejection may be represented by the transition from loaded slot state 5 to empty slot state 0. State 6 represents an ejection request, transitioned by assertion of INSERT_EJECT_EN and INSERT_REQ_STS. State 7 represents an eject wait timer, for allowing sufficient time to close system resources. If a device is to be ejected, as indicated by assertion of EJECT[3:0] and de-assertion of INSERT_REQ_STS, bus mastering for secondary PCI bus 126 is again disabled in state 1.

In state 8, secondary PCI bus 126 is isolated, and in state 9, the ejection is generated, allowing host processor 101 to reconfigure the system. It should be appreciated by one of ordinary skill in the art that the state diagram of FIG. 7 has been simplified to show overall states of operating software.

Applications

The apparatus of the present invention is flexible enough to be applied in a number of applications, thus lowering cost of the invention through volume production. As discussed above, the present invention may be applied to a network server to provide a number of slots for removable devices. In addition, the apparatus of the present invention, without modification, may be provided as an interface for a docking station or the like.

Figure 8:
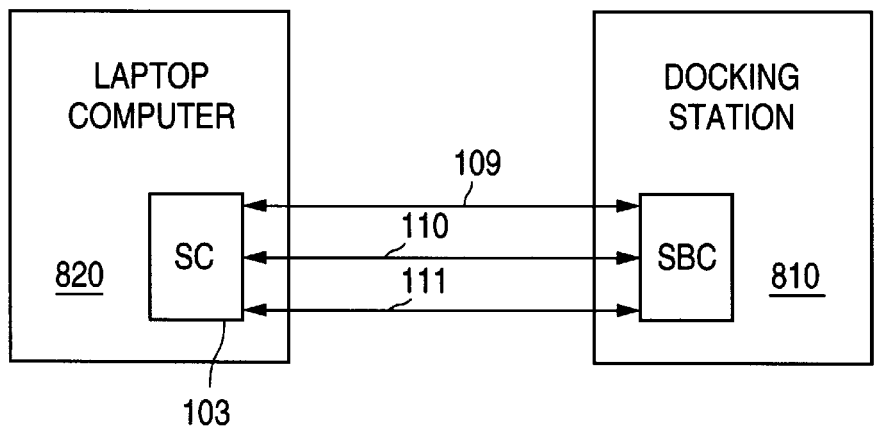
FIG. 8 is a block diagram illustrating how secondary bus controller 120 may be applied in a laptop docking station 810 to dock with a laptop computer 820.

FIG. 8 is a block diagram illustrating how secondary bus controller 120 may be applied in a laptop docking station 810 to dock with a laptop computer 820. A single secondary bus controller 120 within docking station 810 may interface with a primary system controller 130 through a secondary PCI bus connections 109, 110, and 111. One advantage of such a configuration is that laptop computer 820 is provided with a standard secondary PCI bus output port which may be utilized to interface with any PCI type device.

Figure 9:
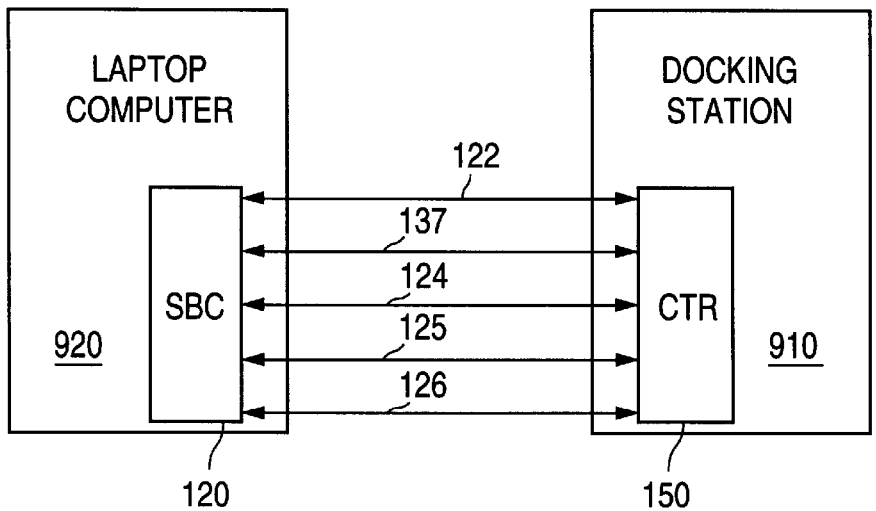
FIG. 9 illustrates how secondary bus controller 120 may be applied in a laptop computer 920 for use with a docking station 910.

FIG. 9 illustrates how secondary bus controller 120 may be applied in a laptop computer 920 for use with a docking station 910. Secondary bus controller 120 may interface through lines 122, 137, 124, 125, and 126 to a connector or fixed devices within docking station 910. Such a configuration allows for insertion and removal of devices from docking station 910 without interruption of laptop computer 920. Moreover, laptop computer 920 may be docked/undocked without interrupting processing. Note that as used in these Figures, the term "laptop" may apply to any computing device, including various portable types.

Figure 10:
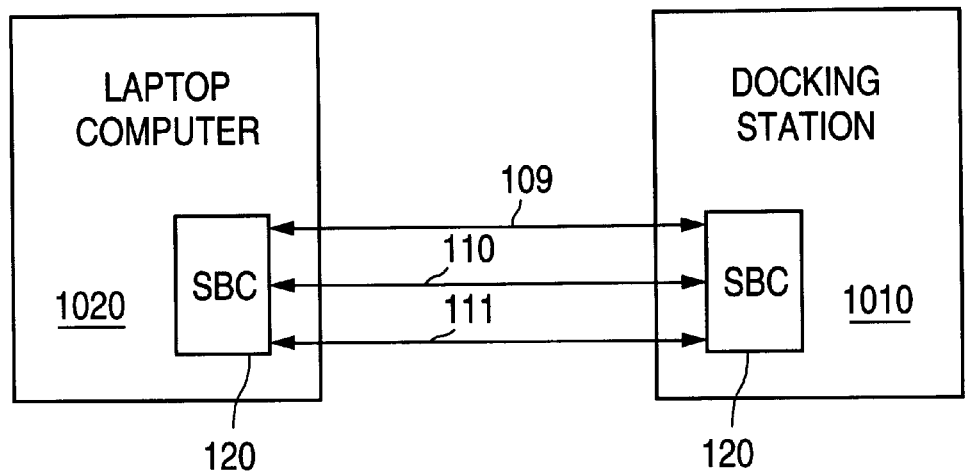
FIG. 10 illustrates how two secondary bus controllers 120 may be applied in a laptop 1020 and docking station 1010.

FIG. 10 illustrates how two secondary bus controllers 120 may be applied in a laptop 1020 and docking station 1010. Recall that secondary bus controller 120 is itself a PCI device and may reside on a secondary bus as a PCI device. Thus, two secondary bus controllers 120 may be provided, one for each of laptop computer 1020 and docking station 1010, to provide a docking interface. the configuration of FIG. 10 provides the advantages of both FIGS. 8 and 9.

Figure 11:
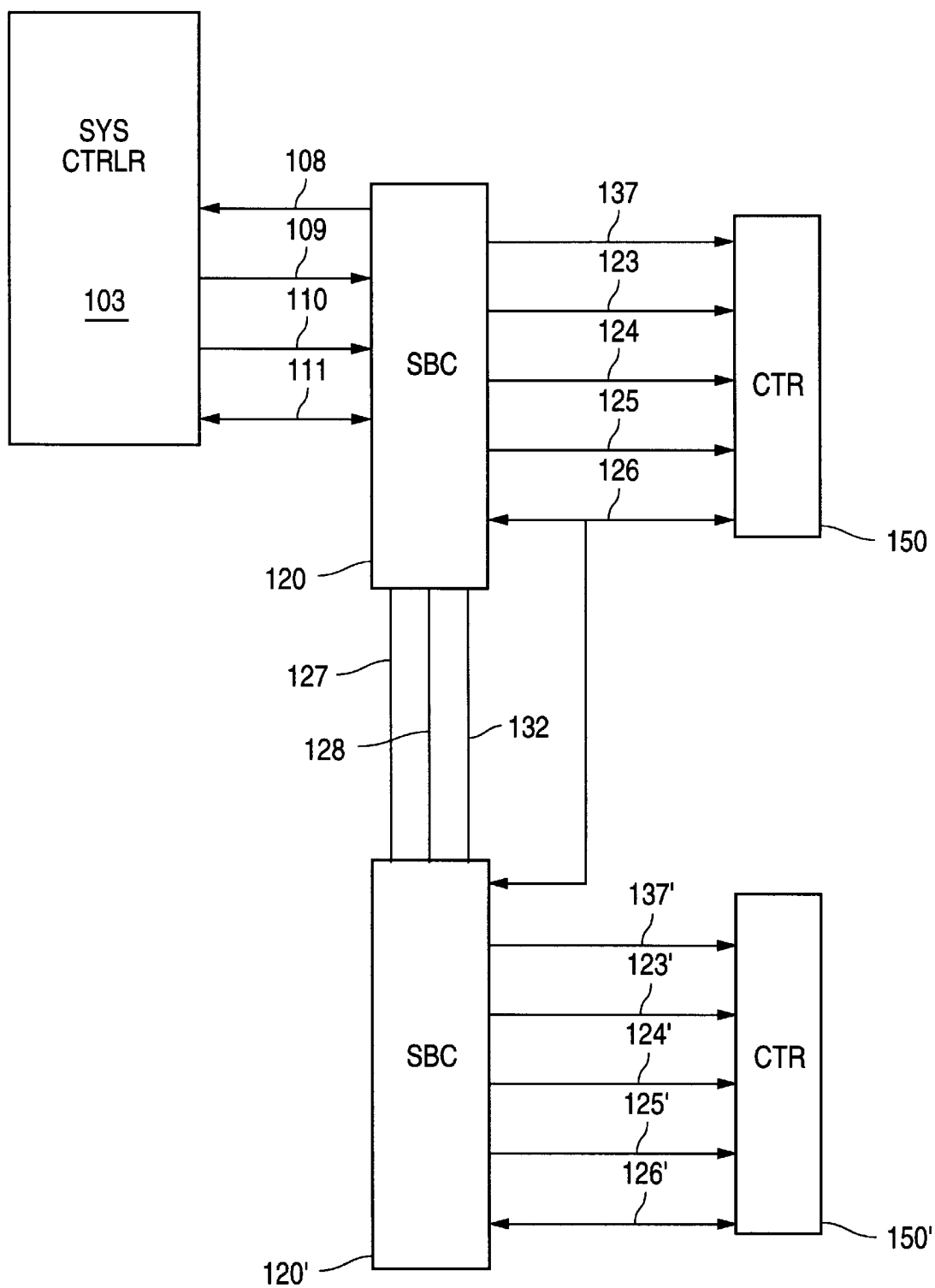
FIG. 11 illustrates how secondary bus controller 120 may be chained in series to expand the number of slots available for removable devices.

FIG. 11 illustrates how secondary bus controller 120 may be chained in series to expand the number of slots available for removable devices. An additional secondary bus controller 120' may be coupled to secondary bus controller 120 as a fixed or removable device and used to drive an additional connector 150'. A number of such secondary bus controllers may be provided to expand the number of available slots for removable PCI devices accordingly.

Figure 12:
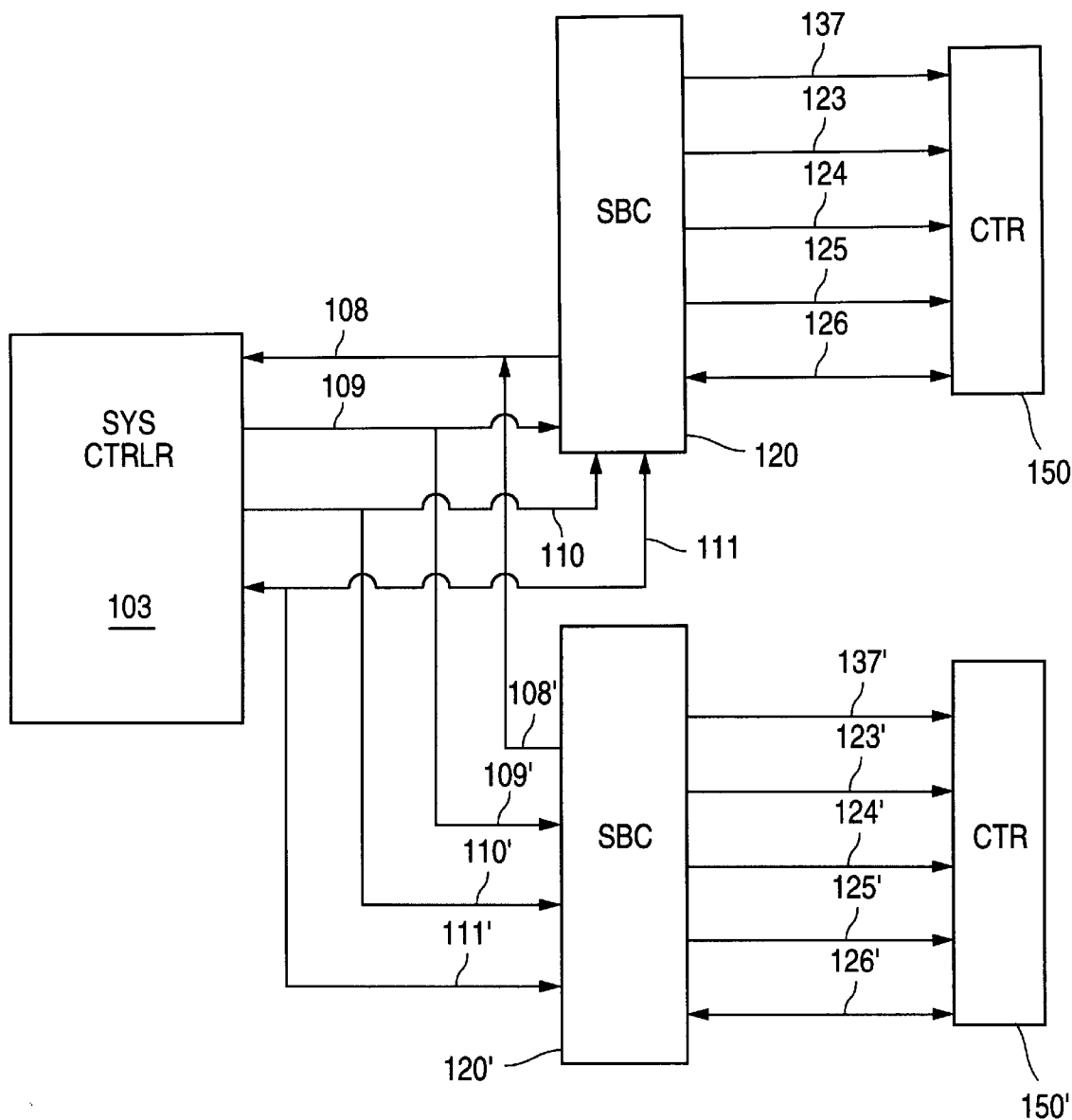
FIG. 12 illustrates how secondary bus controller 120 may be applied in parallel to provide additional removable or fixed device support.

FIG. 12 illustrates how secondary bus controller 120 may be applied in parallel to provide additional removable or fixed device support. On advantage of such a parallel implementation is that only devices supported by one secondary bus controller need shut down during insertion or ejection.

Figure 13:
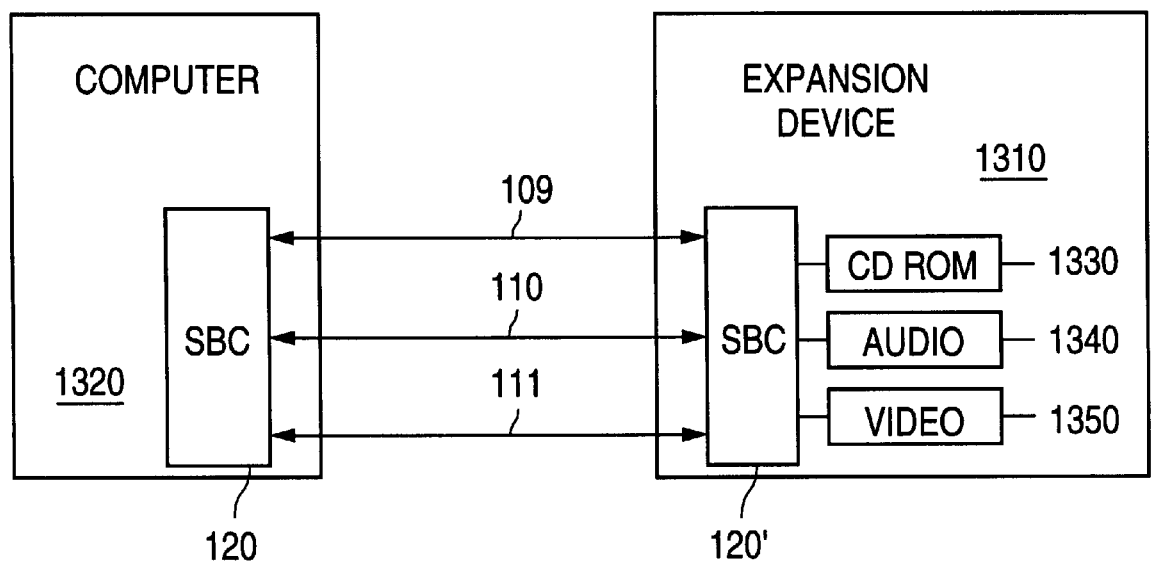
FIG. 13 illustrates how secondary bus controller 120 may be applied to interface a group of devices (expansion device 1310) to computer 1320.

FIG. 13 illustrates how secondary bus controller 120 may be applied to interface a group of devices (expansion device 1310) to computer 1320. The apparatus of FIG. 13 may be applied to supplant an expansion slot, for example, in a network computer or PC. Rather than provide multiple expansion slots in a PC, a single PCI slot may be provided to plug in a plurality of expansion devices or a secondary PCI expansion bus. In addition, a package of devices (e.g., a multimedia kit comprising, for example, a sound card 1340, CD-ROM drive 1330, video card 1350, and the like) may be plugged into computer 1320 (e.g., portable computer) to provide a single slot expansion/upgrade (e.g., to multimedia capability) without having to install configure multiple devices.

As illustrated in the Examples of FIGS. 8–13, the apparatus of the present invention is very flexible and thus may have many applications including those not disclosed herein. It is envisioned that in an initial embodiment of the present invention, a single expansion slot support may be provided for using the device primarily as a docking station support.

Modifications of the present invention may be made without departing from the spirit and scope of the present invention. for example, signals INSERT_REQ[3:0] and EJECT_REQ[3:0] could be combined to notify both insert and eject events by using edges rather than levels to signal such events. Moreover, signal PRSNTS[3:0] could be further qualified with user initiated manual switches to indicate the beginning and end of the insertion or ejection process.

In addition, an insertion/ejection process (i.e., a "replace" process) may be created using the individual steps outlined above to allow a user to replace a particular device in one process step. During such a replace sequence, reconfiguration may be delayed until a new device is inserted. If the device inserted is identical or similar to the device removed (e.g., replacing defective card or the like), then reconfiguration and arbitration may not be necessary.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A method for allowing insertion and removal of a device into an operational computer system without disrupting processing on the computer system, comprising the steps of:

providing a secondary bus for receiving devices to be inserted and ejected from the computer system;

providing a secondary bus controller coupled to a primary bus in the computer system;

receiving, in the secondary bus controller, a first signal indicating a device is to be inserted or removed;

stopping a bus clock on the secondary bus in response to the first signal so as to halt processing on devices coupled to the secondary bus;

allowing insertion and removal of a device from the secondary bus;

receiving a second signal indicating that a device has been inserted or removed;

restarting the bus clock on the secondary bus in response to the second signal;

reconfiguring the computer system for devices present on the secondary bus;

determining, in the secondary bus controller, whether a device is to be inserted or removed and setting a bit in the secondary bus controller indicating whether a device is to be inserted or removed; and signalling, in response to the first signal, an interrupt routine in the host processor, said interrupt routine comprising the steps of:

determining, from the first signal and the bit, whether a device is to be removed or inserted;

determining, if a device is to be inserted, whether the device has been inserted into the secondary peripheral bus in response to the second signal;

setting, in the secondary peripheral bus controller, a bit indicating the secondary peripheral bus controller clock is to be started for the newly inserted device; and setting in the secondary bus controller a bit indicating that the reset signal to the device inserted is to be deasserted.

2. The method of claim 1, wherein said interrupt routine further comprises the step of:

generating a signal to activate a device lock to physically lock the device to the secondary bus.

3. The method of claim 2, wherein the secondary bus controller generates a retry signal to applications attempting access devices on the secondary bus during insertion and removal of a device.

4. The method of claim 1, further comprising the steps of:

stopping bus power on the secondary bus in response to the first signal;

restarting power to the secondary bus in response to the second signal.

5. A method for allowing insertion and removal of a device into an operational computer system without disrupting processing on the computer system, comprising the steps of:

providing a secondary bus for receiving devices to be inserted and ejected from the computer system;

providing a secondary bus controller coupled to a primary bus in the computer system;

receiving, in the secondary bus controller, a first signal indicating a device is to be inserted or removed;

stopping a bus clock on the secondary bus in response to the first signal so as to halt processing on devices coupled to the secondary bus;

allowing insertion and removal of a device from the secondary bus;

receiving a second signal indicating that a device has been inserted or removed;

restarting the bus clock on the secondary bus in response to the second signal;

reconfiguring the computer system for devices present on the secondary bus;

and wherein said step of restarting the bus clock on the secondary bus comprises the steps of:

asserting a reset signal to a newly inserted device on the secondary bus;

restarting the bus clock to the newly inserted device substantially simultaneously with the assertion of the reset signal;

deasserting the reset signal to the newly inserted device on the secondary bus; and restarting the bus clock to devices other than the newly inserted device on the secondary bus.

6. A method for allowing insertion and removal of a device into an operational computer system without disrupting processing on the computer system, comprising the steps of:

providing a secondary bus for receiving devices to be inserted and ejected from the computer system;

providing a secondary bus controller coupled to a primary bus in the computer system;

receiving, in the secondary bus controller, a first signal indicating a device is to be inserted or removed;

stopping a bus clock on the secondary bus in response to the first signal so as to halt processing on devices coupled to the secondary bus;

allowing insertion and removal of a device from the secondary bus;

receiving a second signal indicating that a device has been inserted or removed;

restarting the bus clock on the secondary bus in response to the second signal;

reconfiguring the computer system for devices present on the secondary bus; and signalling, in response to the first signal, an interrupt routine in the host processor, said interrupt routine comprising the steps of:

determining, from the first signal, whether a device is to be removed or inserted; and closing system resources accessing a device to be removed if a device is to be removed.

7. The method of claim 6, further comprising the steps of:

signalling, in response to the second signal, an interrupt routine in the host processor, said interrupt routine comprising the steps of:

determining whether a device has been removed from the secondary bus; and determining which device on the secondary bus has been removed from the secondary bus, wherein said step of reconfiguring the computer system for devices on the secondary bus comprises the step of removing configuration information for the device removed from the secondary bus.

8. The method of claim 7, wherein the secondary bus controller generates a retry signal in response to access requests from the computer system during insertion and removal of a device.

9. A computer system comprising:

at least one host processor;

a host bus, coupled to said at least one host processor, for transmitting data and address information to and from said at least one host processor;

a system controller, coupled to said host bus, for interfacing said at least one host processor to at least one device;

a primary bus, coupled to said system controller, for coupling said system controller to at least one device;

a secondary bus controller, coupled to said primary bus and operating as a device on said primary bus, for interfacing at least one removable device to said at least one host processor;

a secondary bus, coupled to said secondary bus controller, for coupling at least a removable device to said secondary bus controller;

a connector, coupled to said secondary bus, for receiving and connecting at least one removable device to said secondary bus;

removable device presence detection means, coupled to said secondary bus controller, for indicating presence of a removable device;

an insertion request means, coupled to said secondary bus controller, for receiving an insertion request signal indicating a request to insert a device into said connector;

an eject request means, coupled to said secondary bus controller, for receiving an removal request signal indicating a request to eject a device from said connector;

an insert start means, coupled to said secondary bus controller, for receiving an insertion start signal indicating a device is being inserted into said connector;

wherein said removable device presence detection means comprises a first and second power control signals coupled to said connector, for receiving a signal indicative of a power requirement of a removable device; and logic means, coupled to said removable device presence detection means and said insert start means, for combining signals from said removable device presence detection means and said insert start means and outputting a removable device presence signal to said secondary bus controller.

10. A computer system of claim 9, wherein said logic means further comprises:

an AND gate and ANDing the first and second power control signals to produce the removable device presence signal to said secondary bus controller.

11. A computer system of claim 9, wherein said logic means further comprises a connection for connecting the first and second power control signals to produce the removable device presence signal to said secondary bus controller.

12. The computer system of claim 9, further comprising:

a notification interrupt means coupling said secondary bus controller and said system controller, for transmitting a interrupt signal to said at least one host processor, wherein said secondary bus controller generates an interrupt signal upon insertion and removal of a removable device from said connector.

13. The computer system of claim 12, further comprising:

a secondary bus clock line for transmitting clock signals to said connector, wherein said secondary bus controller controls clock signals over said secondary bus clock line to said connector to suspend clock signals to said connector upon receipt of a removal request signal on said removal request means and up on receipt of a insert request signal on said insertion request means.

14. The computer system of claim 13, further comprising:

a secondary bus reset means for transmitting reset signals to said connector, wherein said secondary bus controller de-asserts reset signals over said secondary bus reset means to devices present in said connector prior to insertion and removal, and said secondary bus controller asserts are set signal to a device inserted into said connector after said device has been inserted.

15. A secondary bus controller comprising:

first means for interfacing said bus controller with a primary bus interface so as to configure said secondary bus controller as a device on said primary bus interfaces;

second means for interfacing said secondary bus controller with a secondary bus; and a secondary bus clock control means for controlling secondary bus clock signals to one or more removable devices on the secondary bus;

a secondary bus reset control means for controlling secondary bus reset signals to one or more removable device on the secondary bus; and wherein said secondary bus clock signals are stopped during insertion and removal of a device on said secondary bus; and wherein a reset signal is asserted on said secondary bus reset control means to a newly inserted device when the device is inserted into the secondary bus; and wherein clock signals to the newly inserted device on the secondary bus are started substantially simultaneously with assertion of the reset signal to the newly inserted device.

16. The secondary bus controller of claim 15, wherein clock signals to other devices on the secondary bus are restarted substantially simultaneously with deassertion of the reset signal to the newly inserted device.

17. A secondary bus controller comprising:

first means for interfacing said bus controller with a primary bus interface so as to configure said secondary bus controller as a device on said primary bus interface;

second means for interfacing said secondary bus controller with a secondary bus;

a secondary bus clock control means for controlling secondary bus clock signals to one or more removable devices on the secondary bus;

a notification interrupt means, for coupling the secondary bus controller with a system controller and for transmitting an interrupt signal to the system controller when a device is inserted or removed from the secondary bus;

an ejection request means for receiving a signal indicating a request to remove a device from the secondary bus; and an insert request means, for receiving a signal indicating a request to insert a device into the secondary bus.

18. The secondary bus controller of claim 17, wherein said notification interrupt means generates an a first interrupt signal upon insertion of a device into the secondary bus, a second interrupt signal upon indication of a request to remove a device from the secondary bus, and a third interrupt signal upon removal of a device from the secondary bus.

* * * * *